Figure 19:
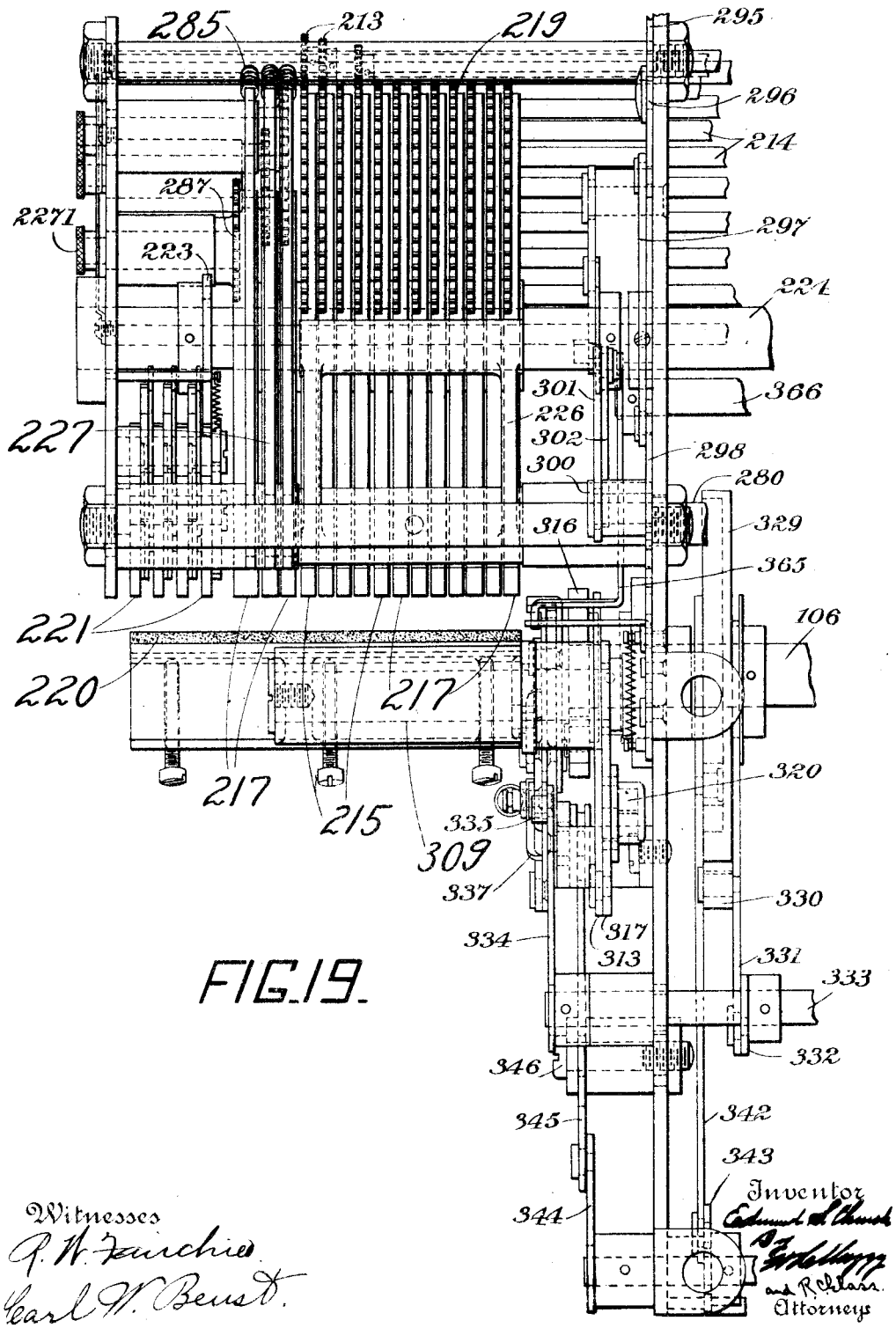

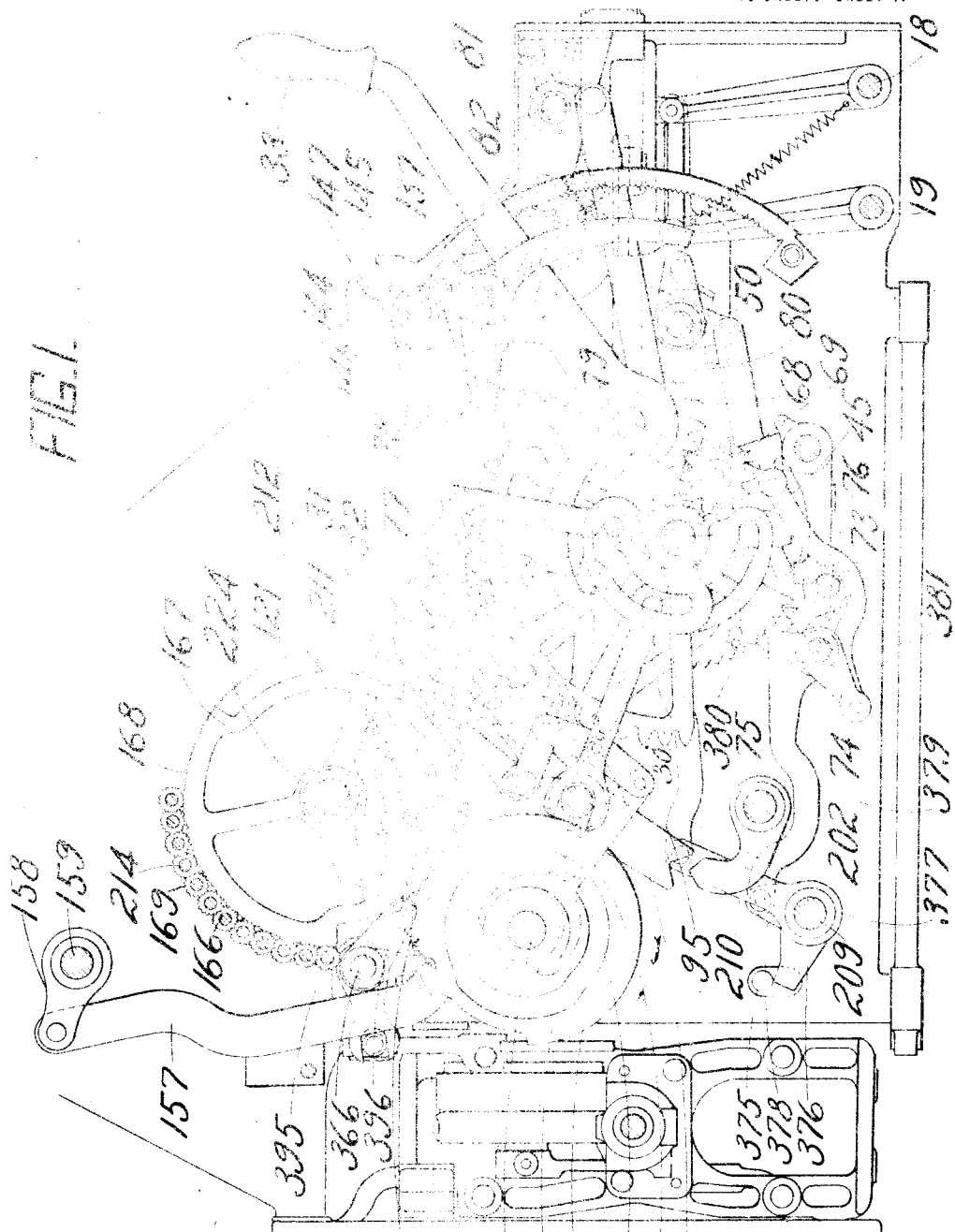

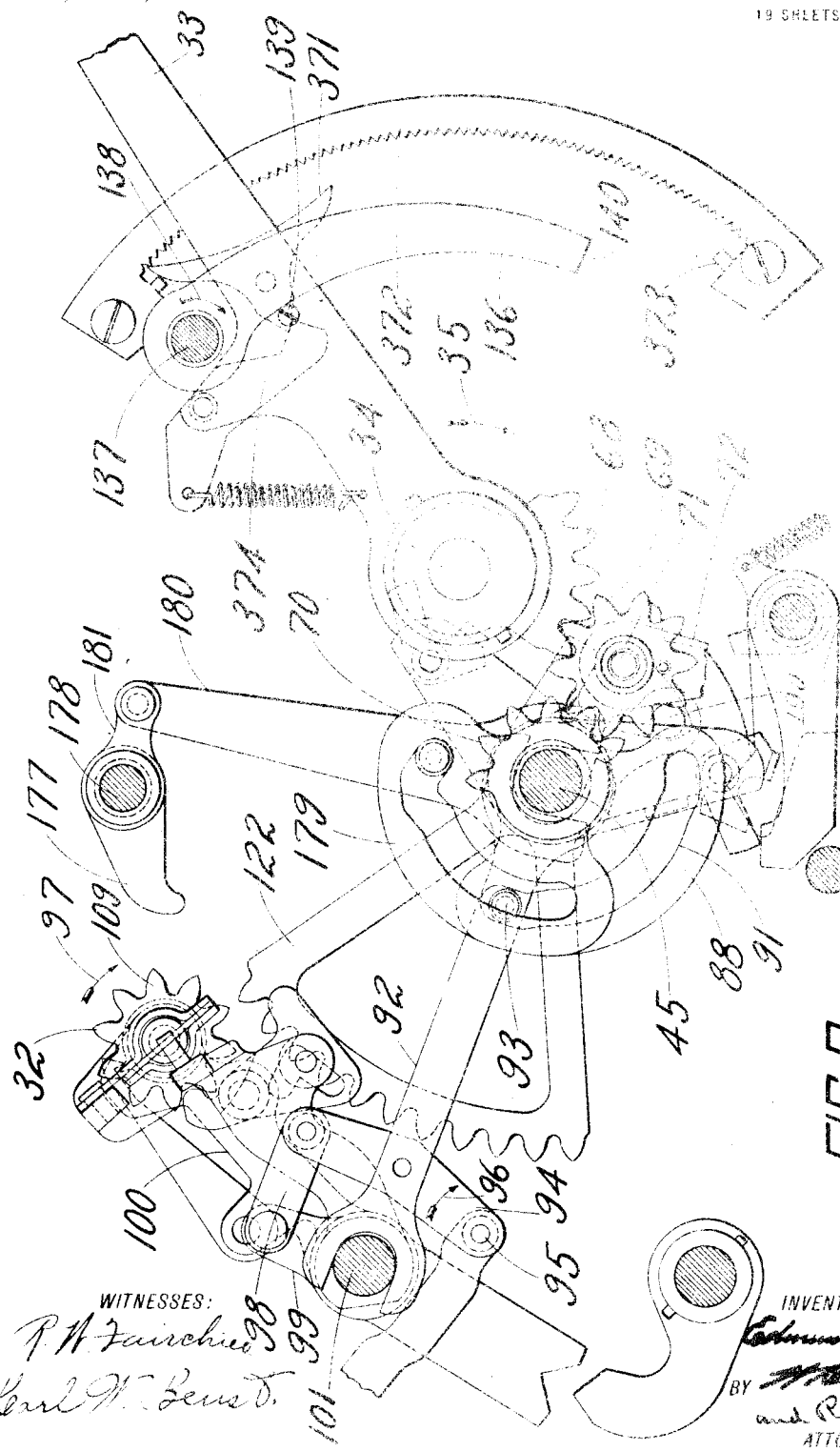

E. S. CHURCH.
CASH AND CREDIT REGISTER.
APPLICATION FILED JAN. 24, 1910.
1,169,773.
Patented Feb. 1, 1916.
19 SHEETS—SHEET 3.
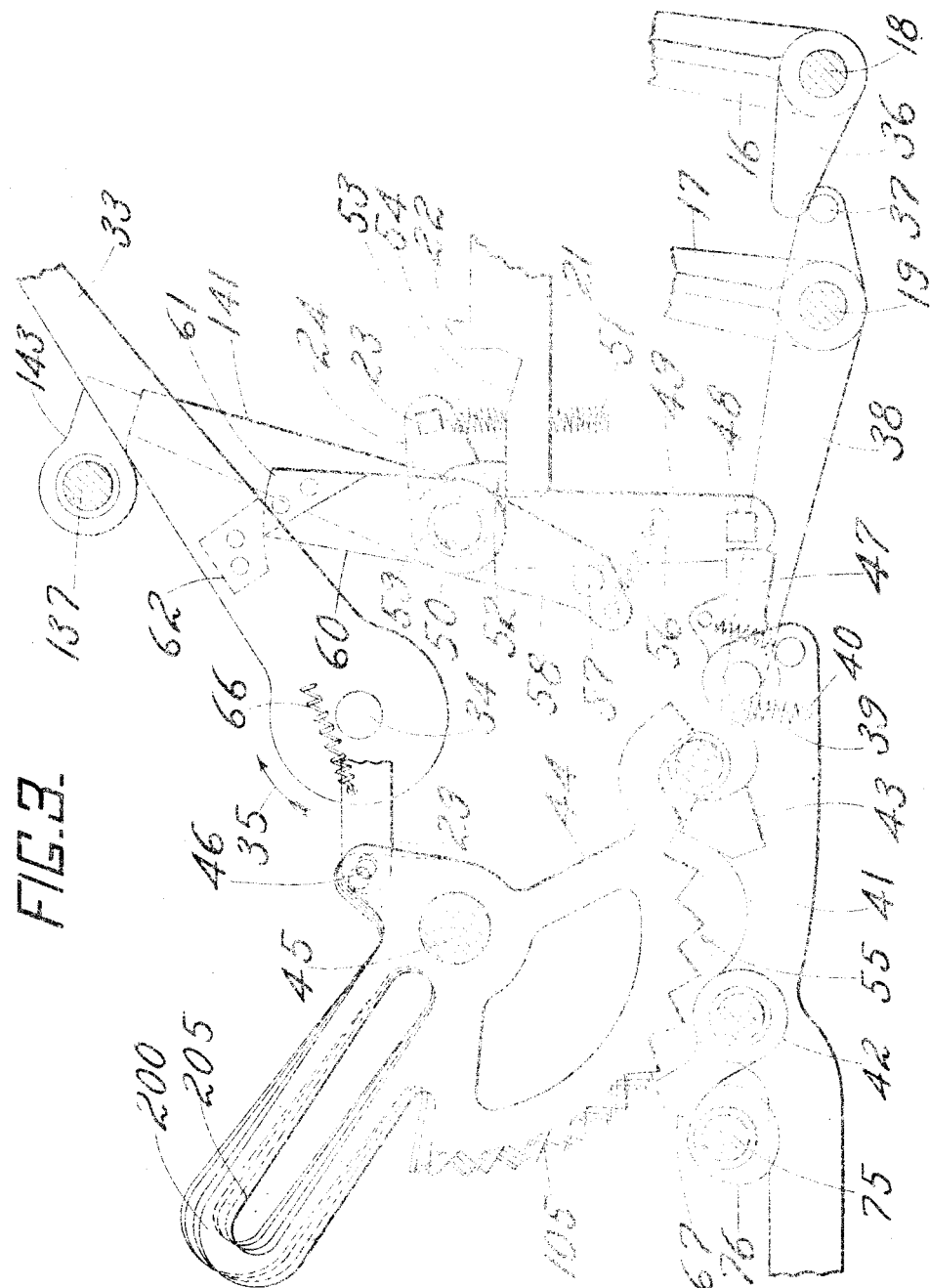

E. S. CHURCH.
CASH AND CREDIT REGISTER.
APPLICATION FILED JAN. 24, 1910.
1,169,773.
Patented Feb. 1, 1916.
19 SHEETS—SHEET 4.
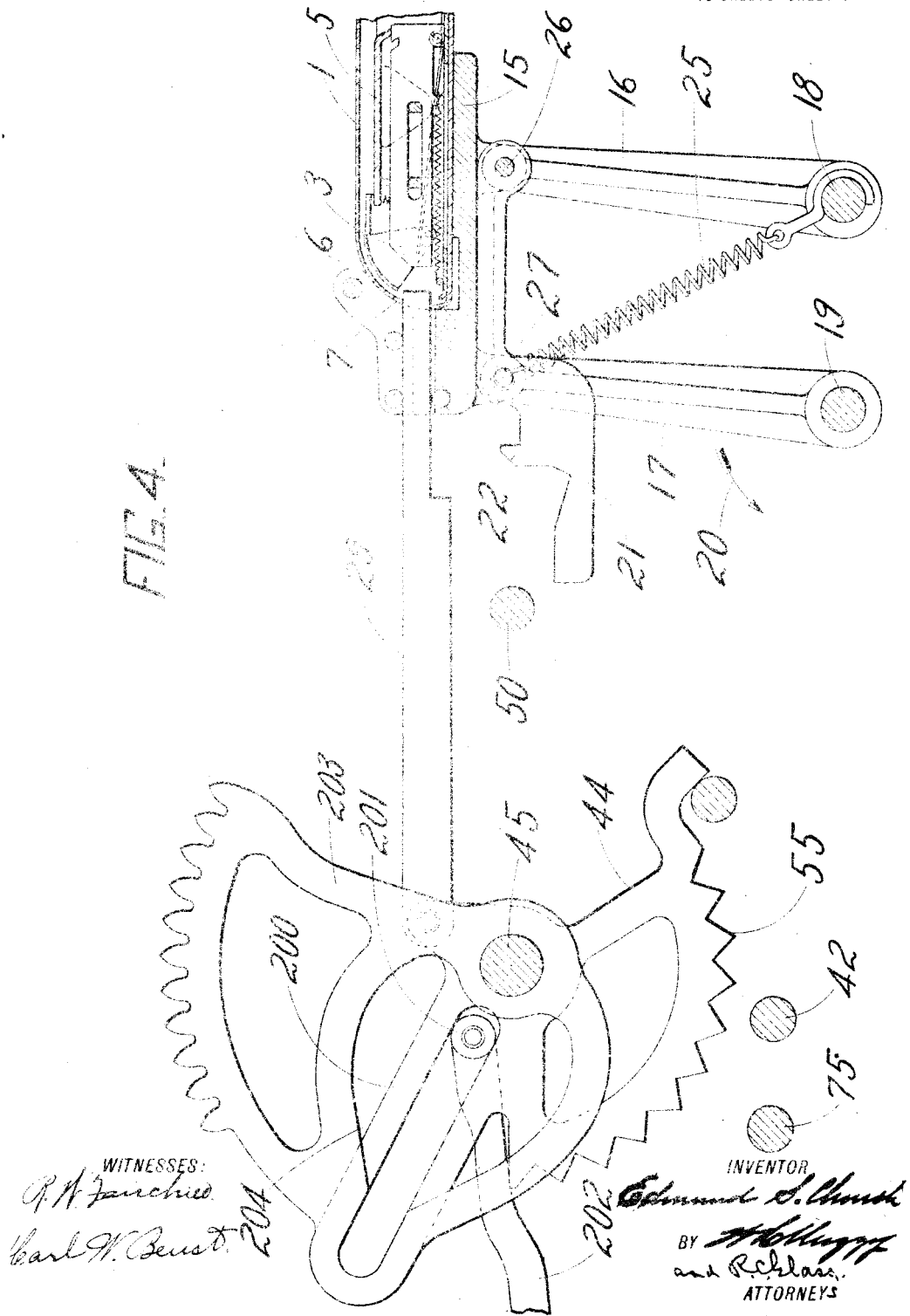

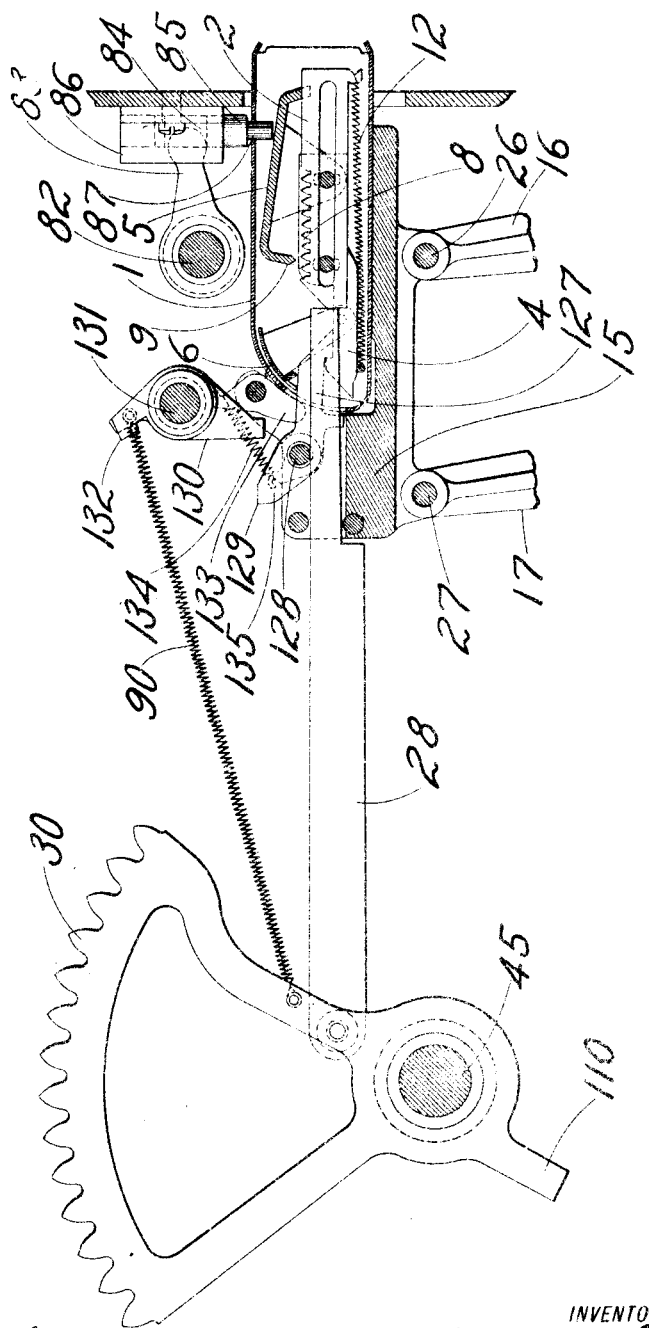

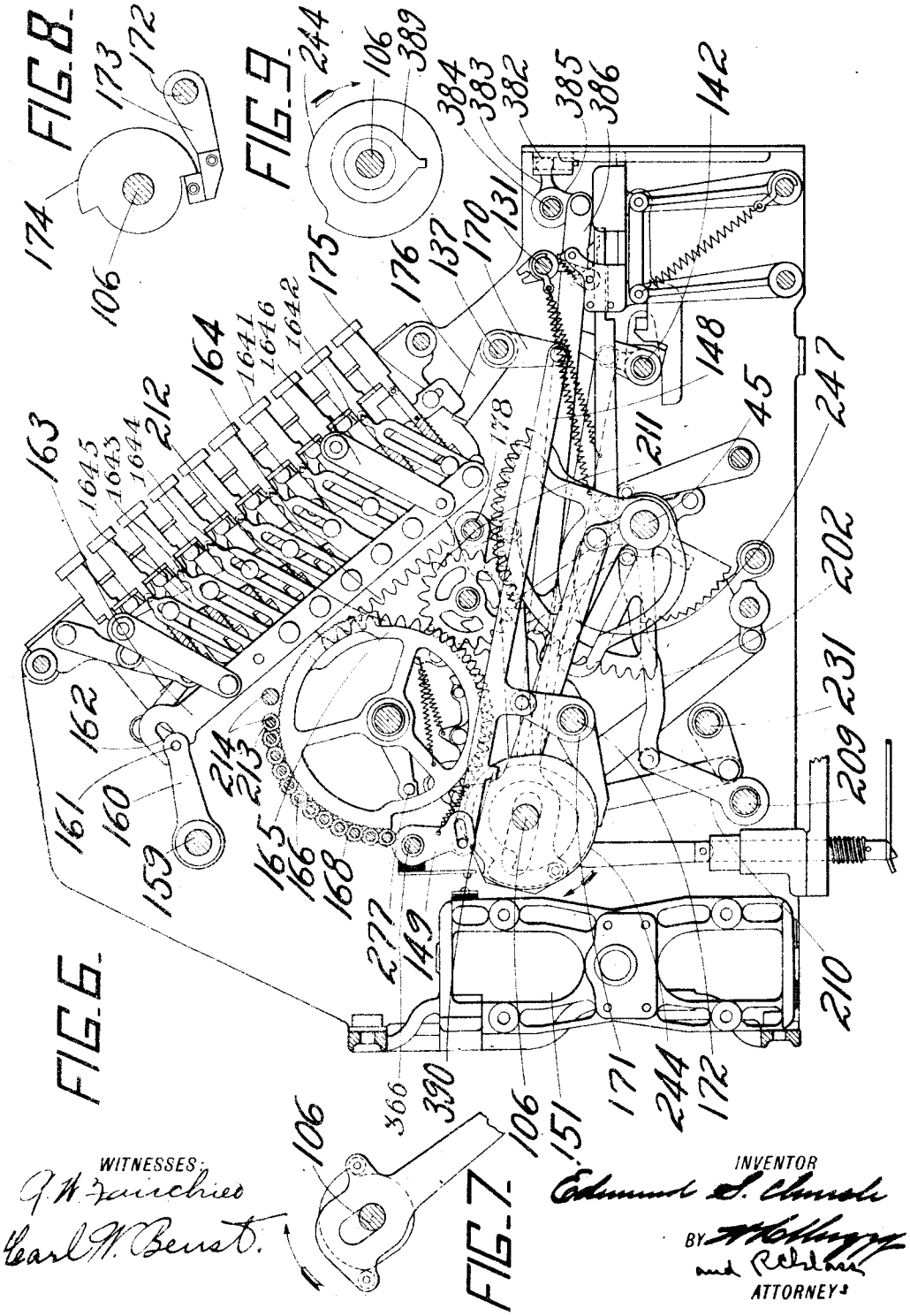

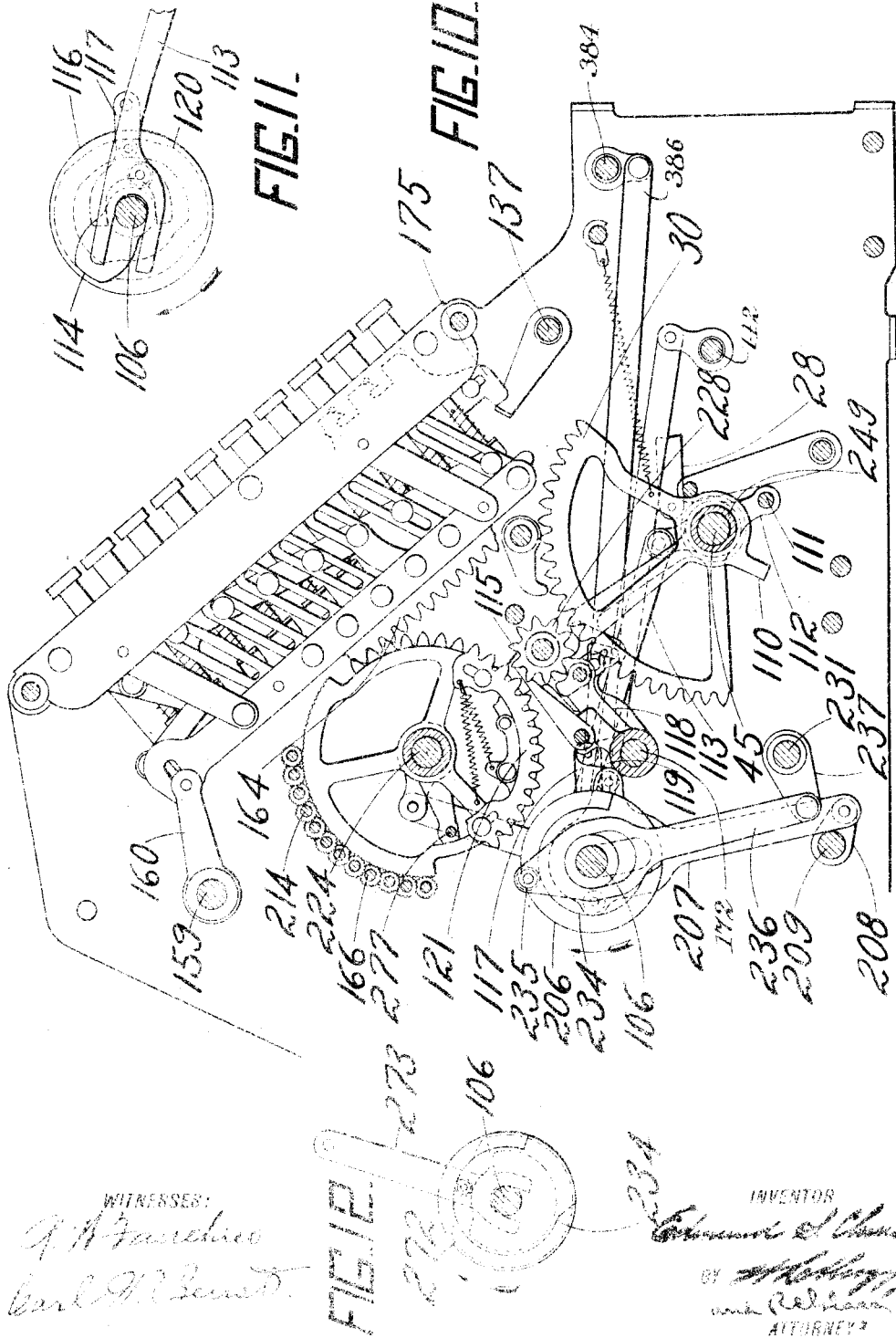

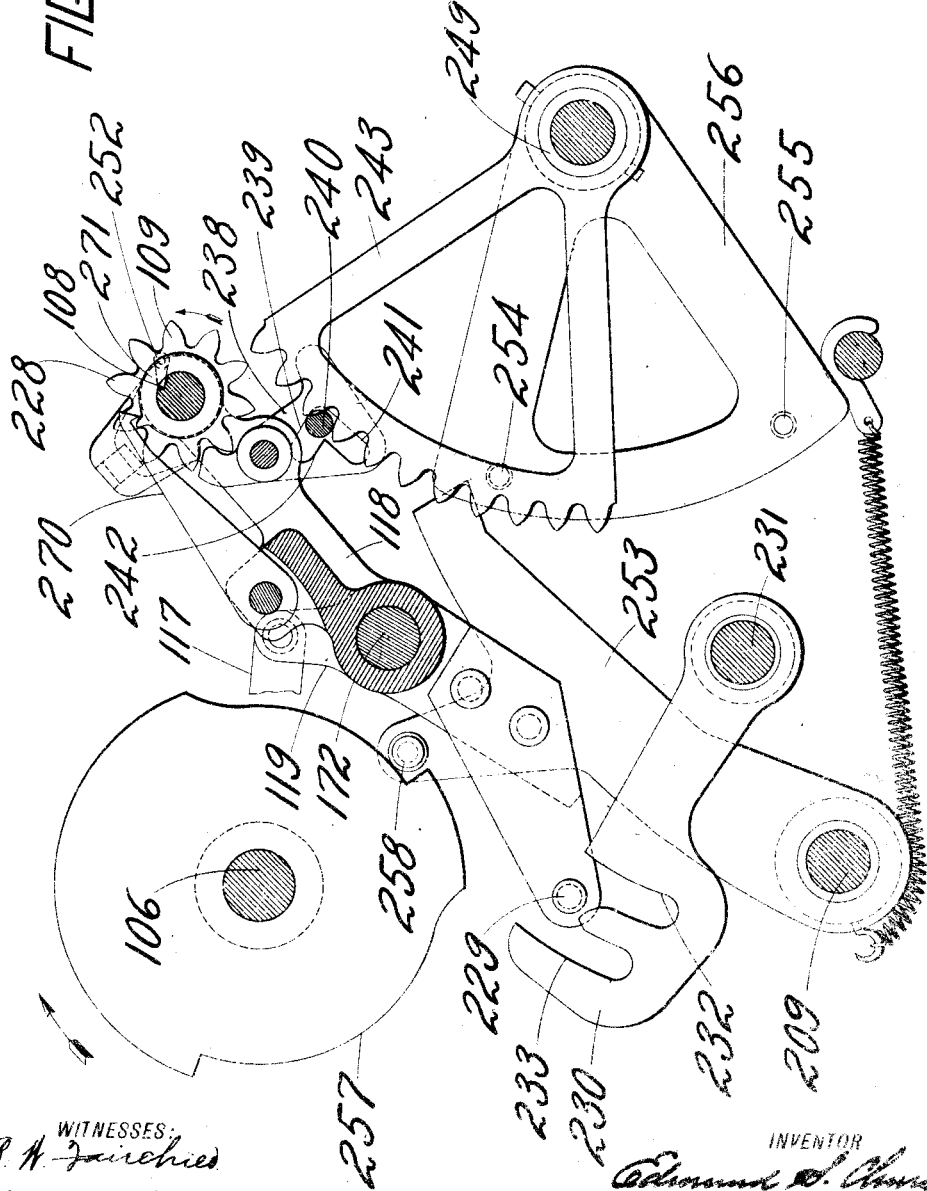

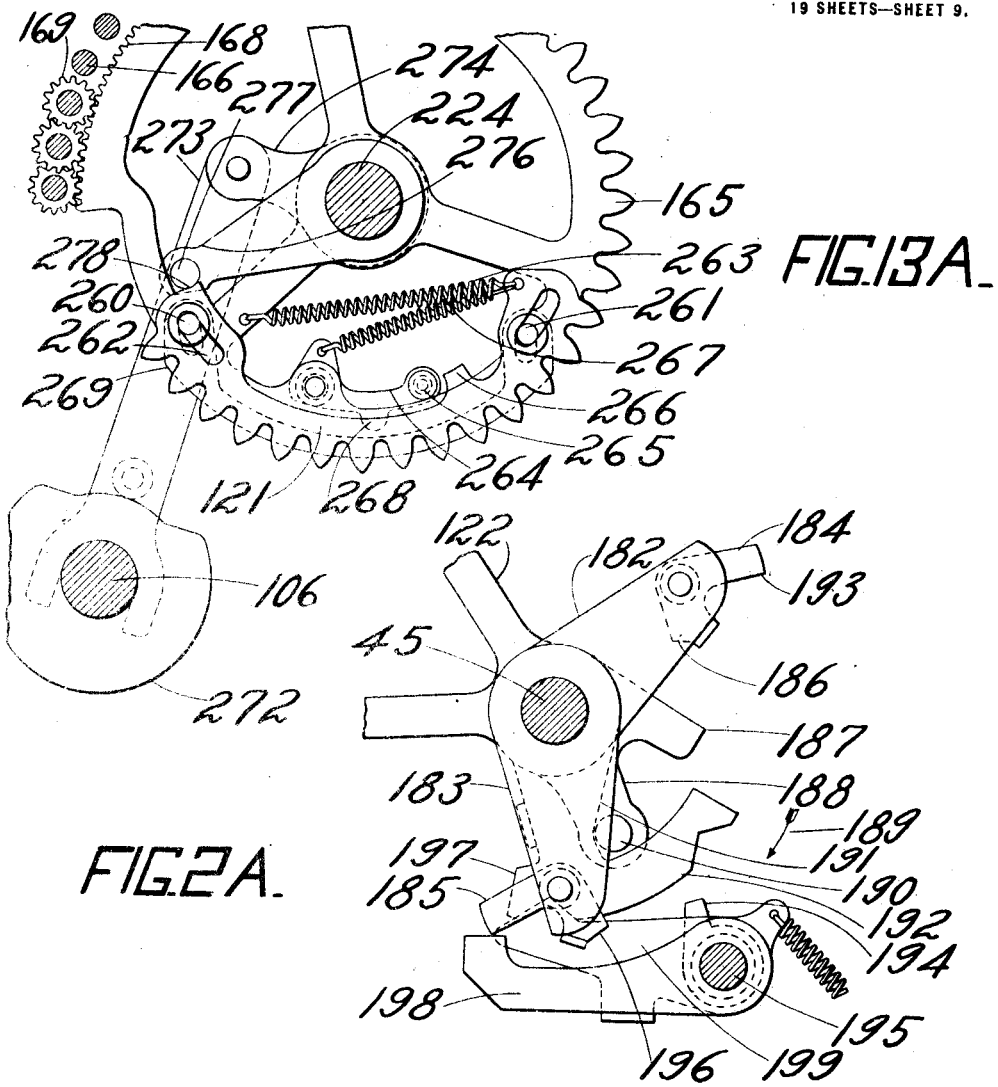

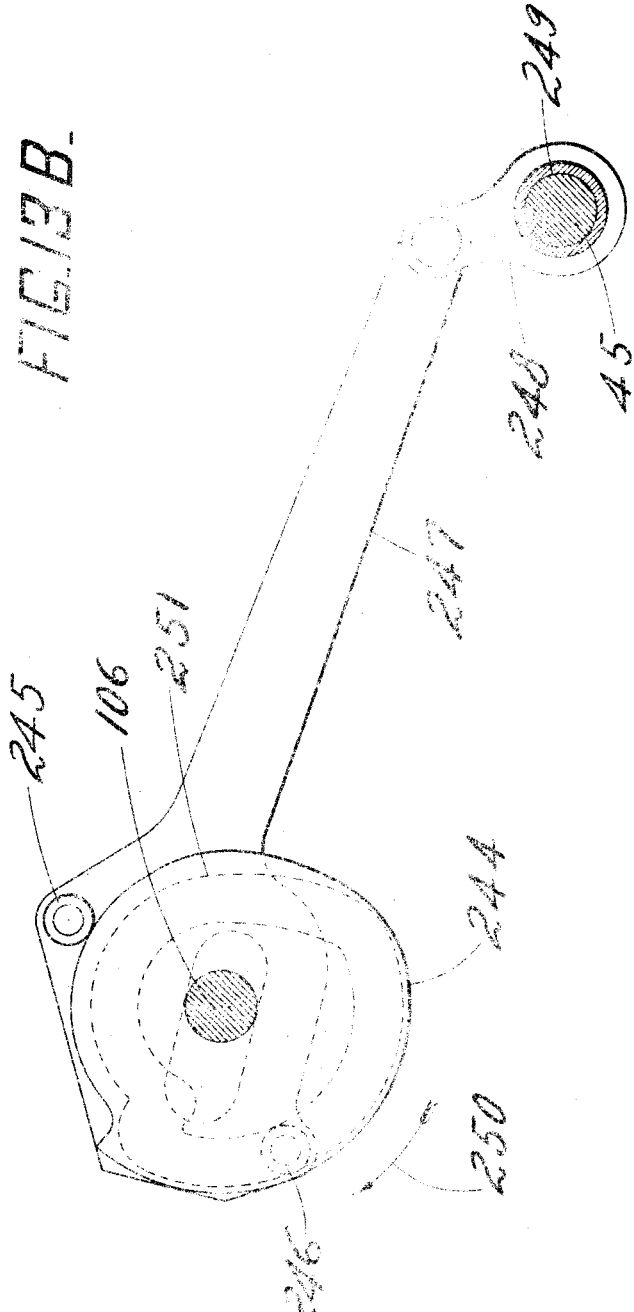

E. S. CHURCH.
CASH AND CREDIT REGISTER.
APPLICATION FILED JAN. 24, 1910.
1,169,773.
Patented Feb. 1, 1916.
19 SHEETS—SHEET 11.
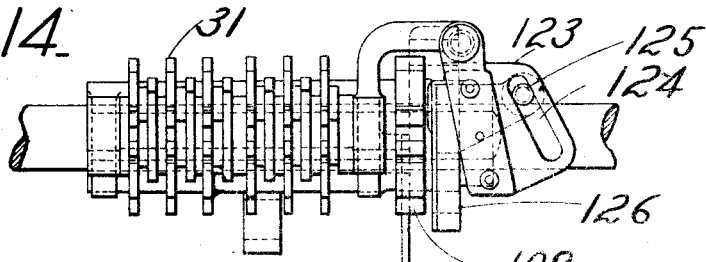
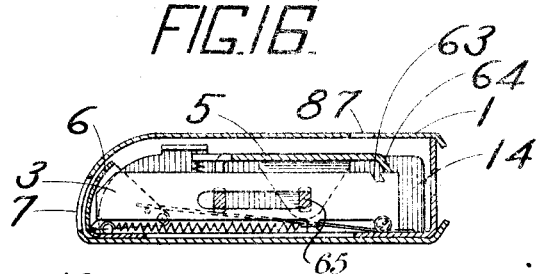
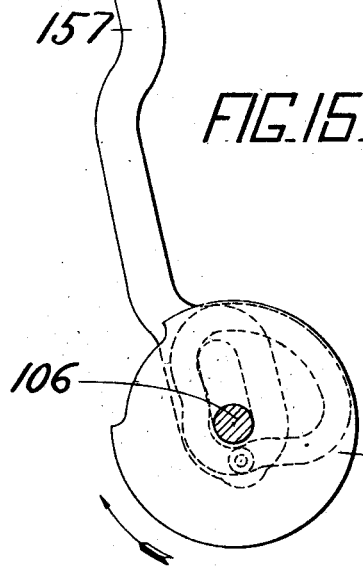
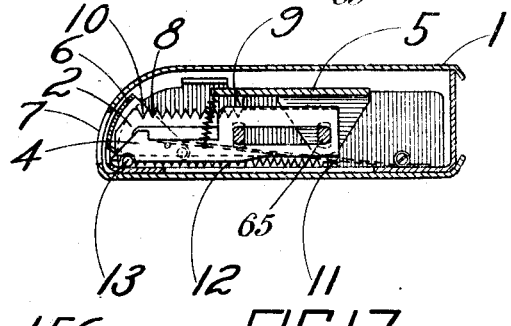
WITNESSES:
INVENTOR
ATTORNEYS

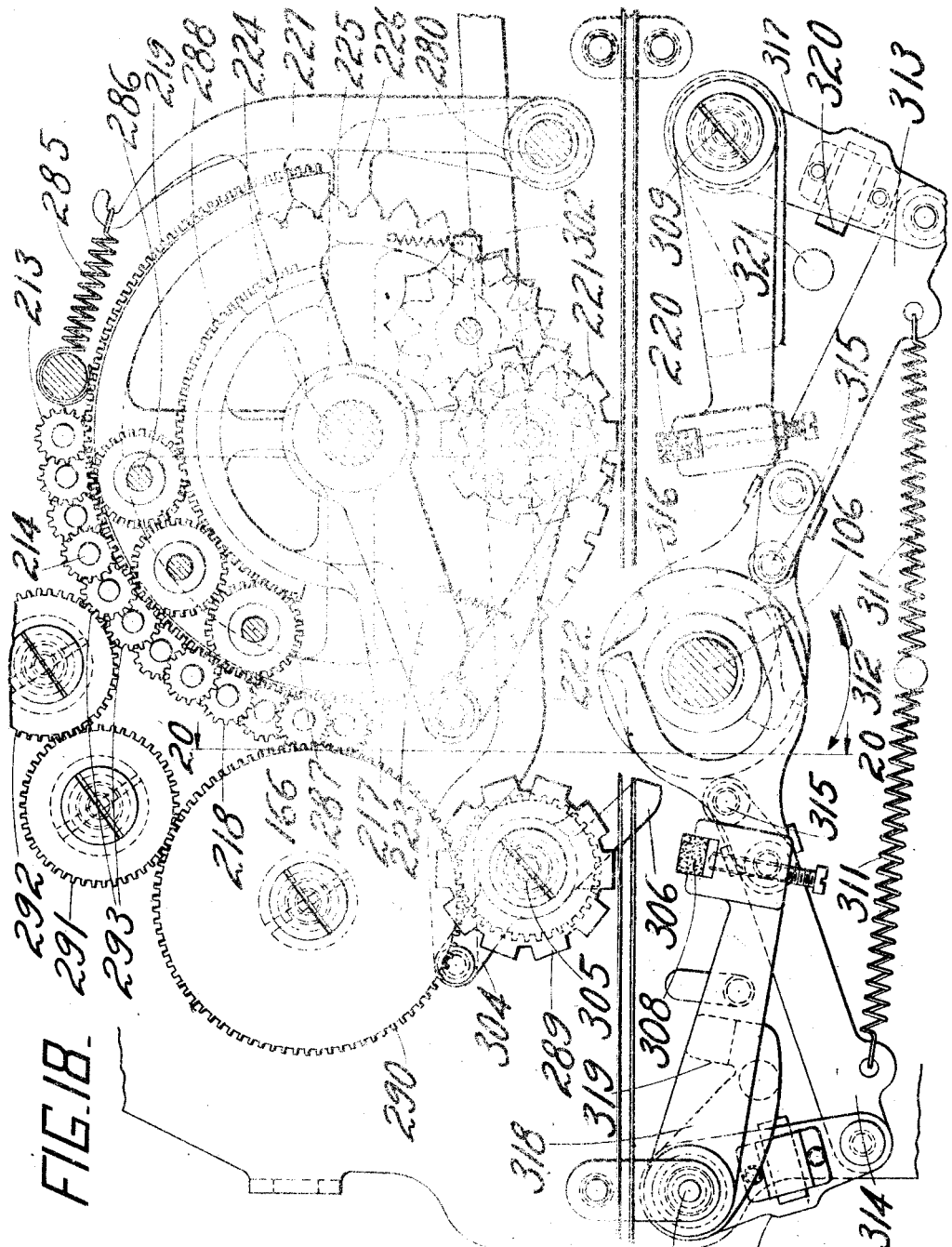

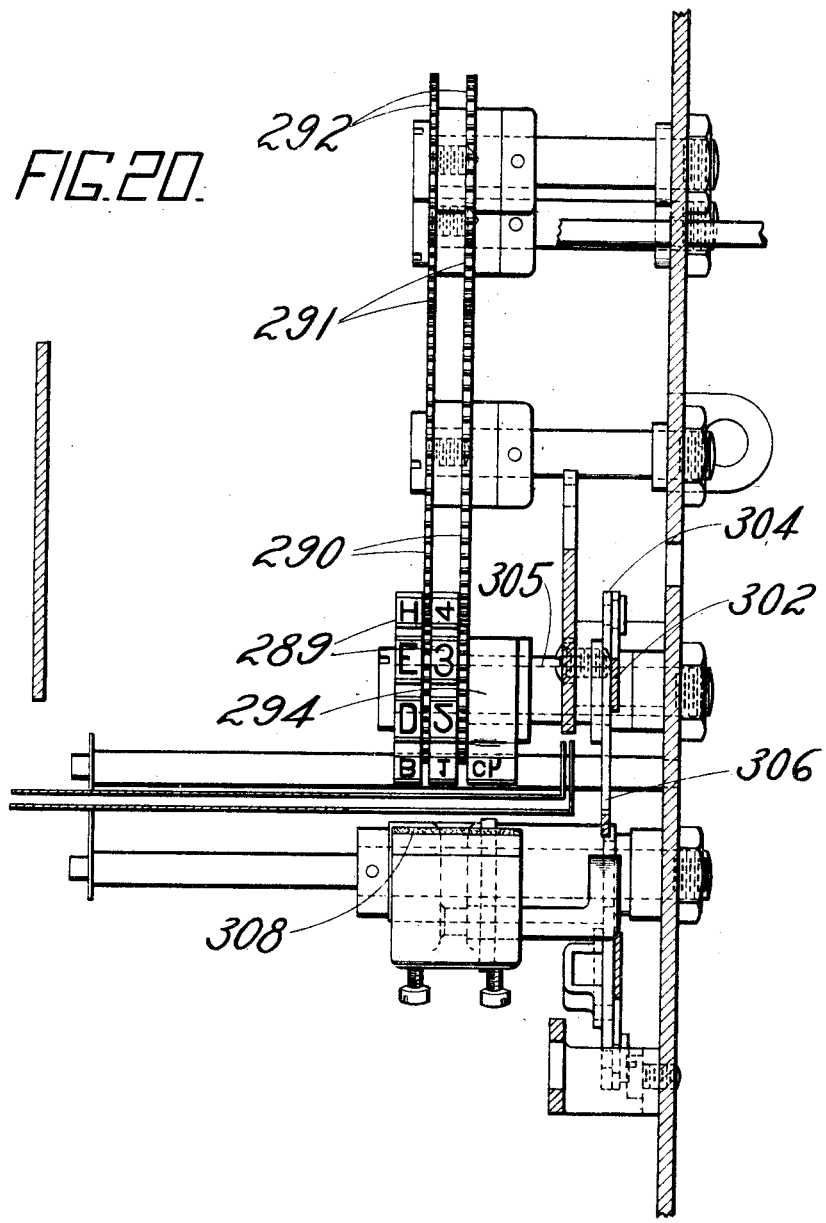

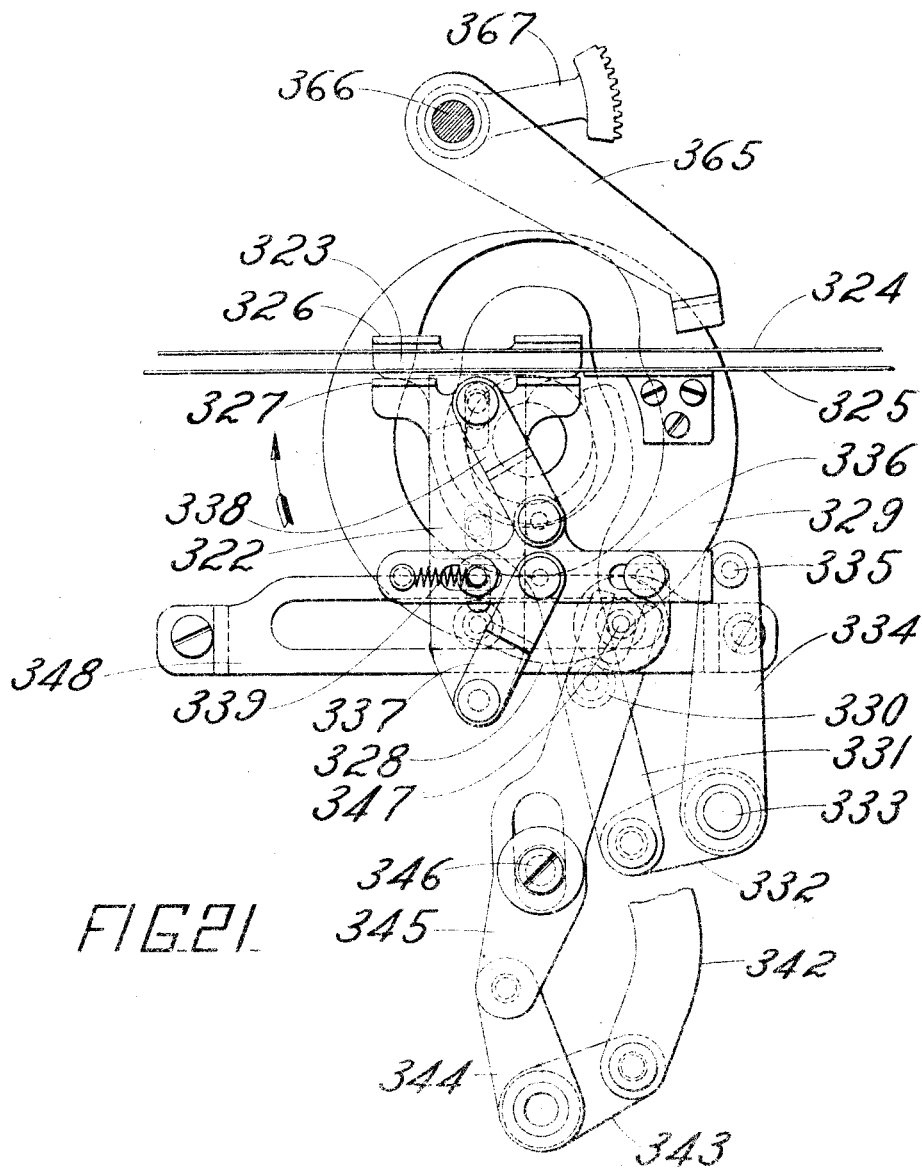

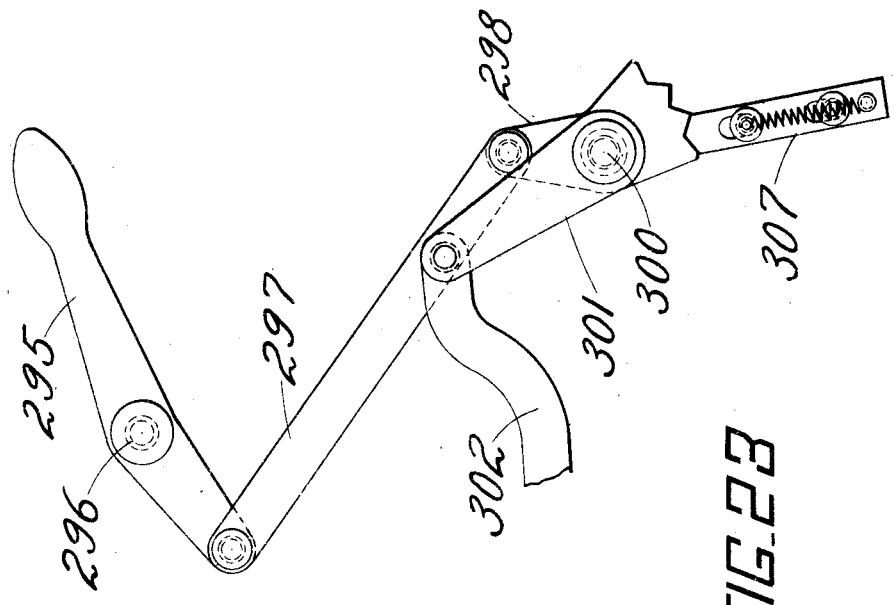
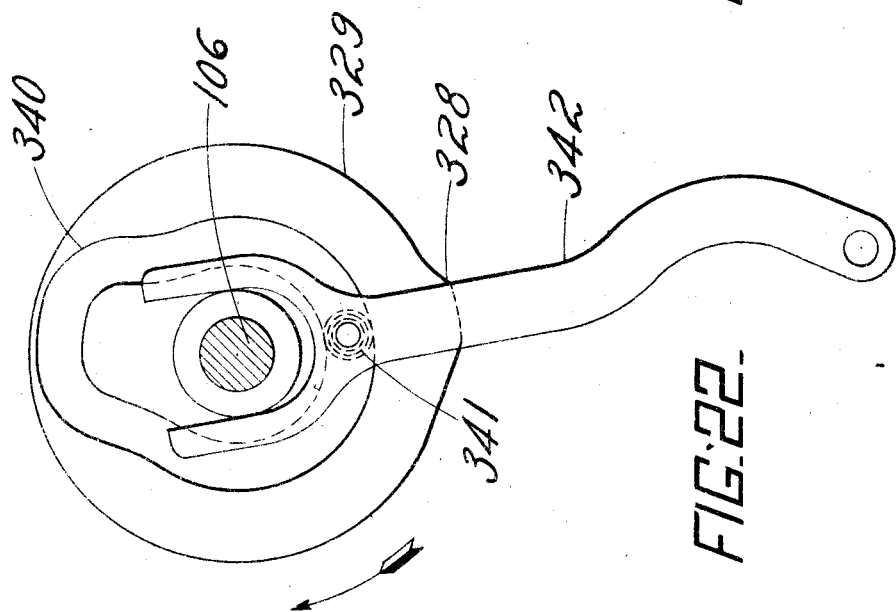

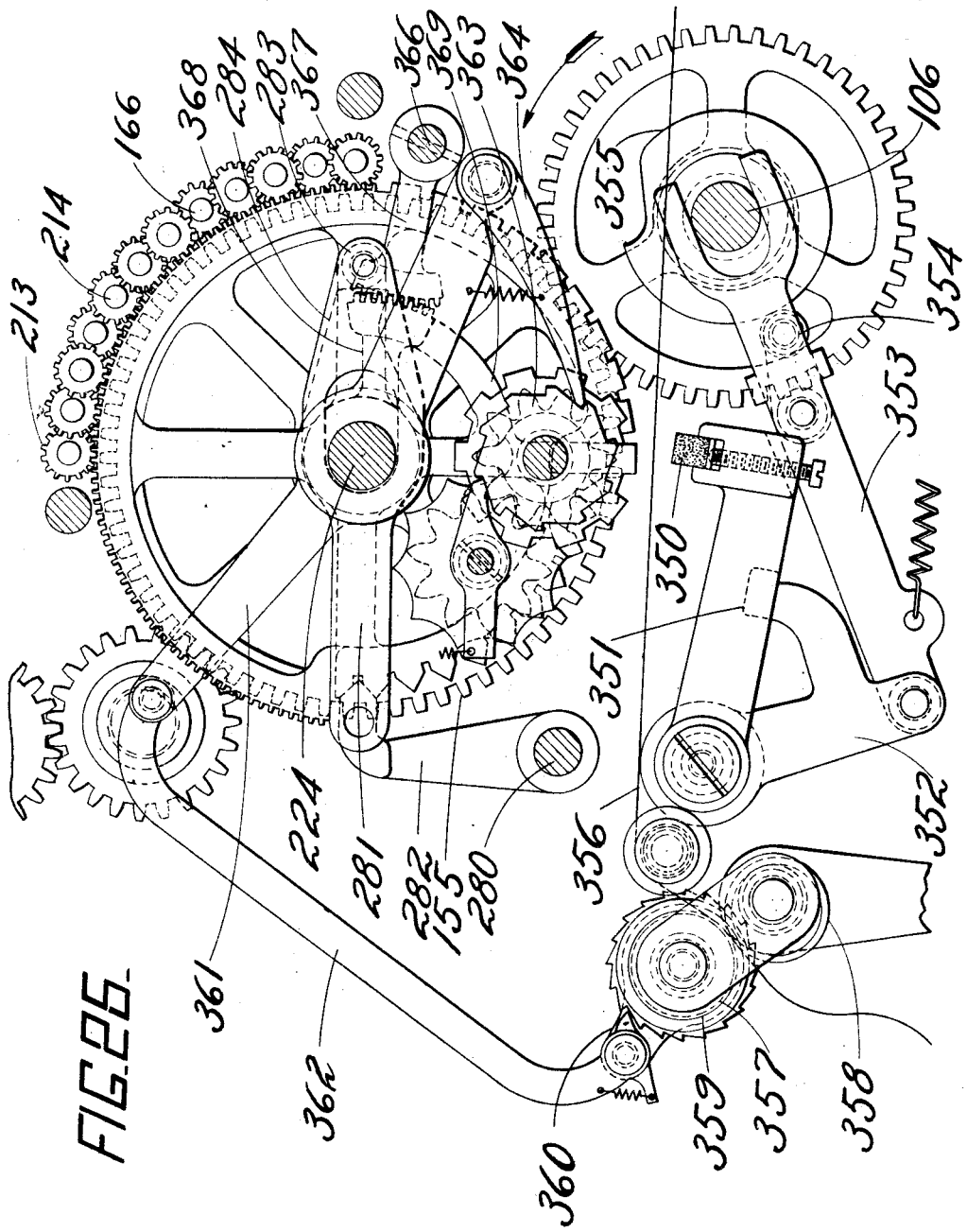

E. S. CHURCH.
CASH AND CREDIT REGISTER.
APPLICATION FILED JAN. 24, 1910.
1,169,773.
Patented Feb. 1, 1916.
19 SHEETS—SHEET 19.
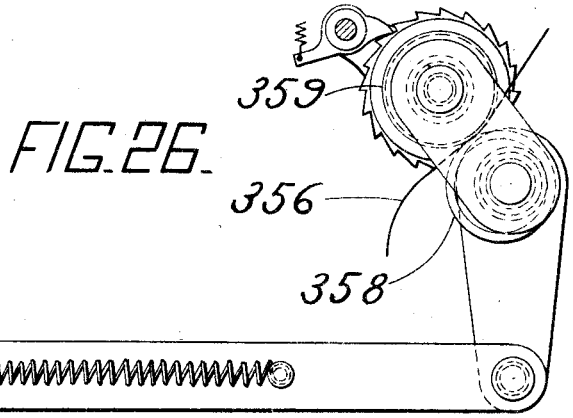
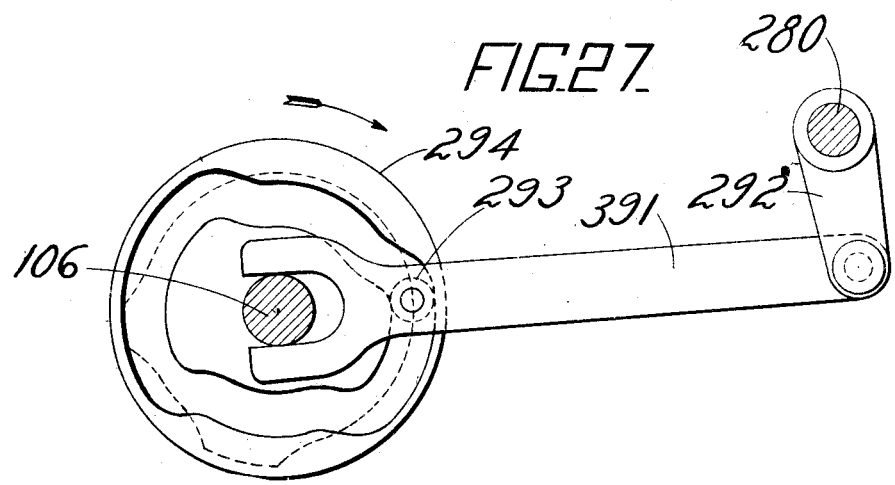
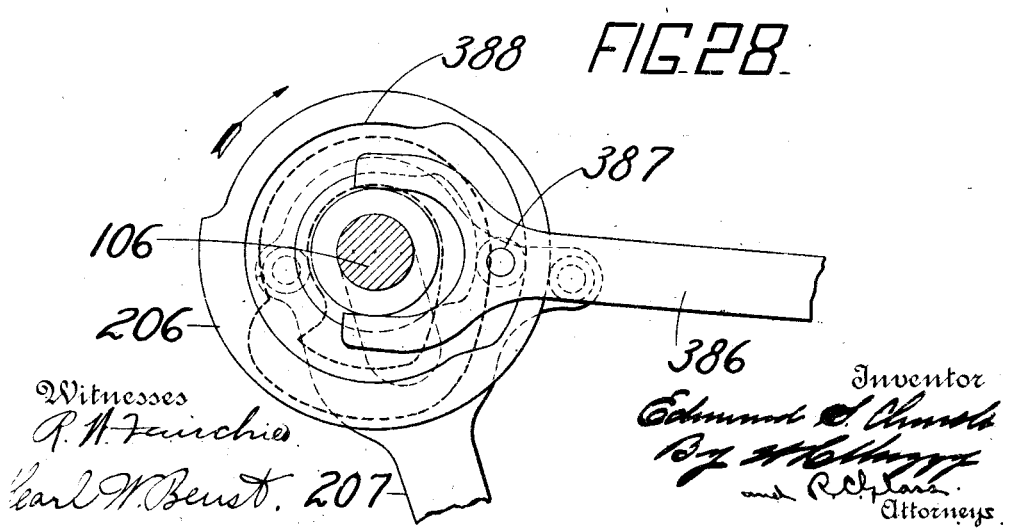

UNITED STATES PATENT OFFICE.

EDMUND S. CHURCH, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH AND CREDIT REGISTER.

1,169,773.  Specification of Letters Patent.  Patented Feb. 1, 1916.

Application filed January 24, 1910. Serial No. 539,534.

*To all whom it may concern:*

Be it known that I, EDMUND S. CHURCH, a citizen of the United States, residing at Dayton, in the county of Montgomery and State of Ohio, have invented certain new and useful Improvements in Cash and Credit Registers, of which I declare the following to be a full, clear, and exact description.

This invention relates to cash registers and it is herein shown embodied in a machine adapted for such uses as are required by department stores.

The machine is intended to be operated by a cashier and performs the following work: The amount of each registration is added to two detachable accumulating devices, is printed upon a detail strip and is also printed upon an original and duplicate sales slip. Separate detachable accumulating devices are provided for each cashier and for each clerk. When a sale is made the clerk who has the transaction in charge writes the required memorandum of the sale upon one of the usual sales slips. The sales slips are double and carbon is placed between the two halves of the slip so that the record will appear both on the original and the duplicate. The part of the original slip which receives the written record is then torn from the remainder of the slip and kept by the clerk as a memorandum of the sale. The clerk then hands the slip together with his detachable accumulating device to the cashier. The cashier sets up the amount of the transaction upon the keyboard, inserts the clerk's accumulating device into the machine and also places the sales slip in the sales slip printer. The cashier then depresses a motor key and the driving mechanism is operated, this operation causing the amount which is set up on the keyboard to be transferred to the clerk's accumulating device and to the cashier's accumulating device, which latter device is inserted into the machine at the time the cashier comes on duty. Simultaneously with transferring the amount of the transaction to the cashier's and clerk's accumulating devices the detail record is printed upon a paper ribbon which the machine contains and the sales slip receives a printed record of the transaction in duplicate. The matter which is printed upon the detail strip includes the clerk's identifying number, which number is set up by means of blades of different lengths carried by the clerk's accumulating device; the cashiers' identifying characters which are similarly determined by slides carried by the cashier's accumulator; the amount of the sale; the class of transaction; and the consecutive number of the transaction. Similar matter is printed upon the sales slip but it is here printed in duplicate and the sales slip is shifted between the printing operations so that one record will appear on the original and the other record will appear upon the duplicate slip on the surface which was exposed by tearing away part of the original slip, as previously stated. A dating device is also provided in the slip printer so that the dates of transactions will appear upon the sales slips.

The present machine is not provided with means for resetting the detachable accumulating devices nor is it provided with means for ascertaining the totals which have been accumulated by these devices. For this reason this invention is part of an accounting system which, to be complete, requires auditing or reading and resetting devices for the detachable accumulators. Such auditing devices are described in the following two United States patent applications: Edmund S. Church—auditing machine for detachable accounting devices, Serial No. 570,389. Edmund S. Church—reading and resetting device for detachable accounting devices, Serial No. 570,388.

From the above outline it readily may be seen that by this invention, from the fact that each clerk has possession of his accumulating device, there is little danger of the cashier making errors in causing registrations to be made in the wrong accumulating devices, similarly each cashier is in possession of his accumulating device which is supposed to be in the machine only during the time the cashier is on duty.

The machine is provided with interlocking devices which prevent the operation of the machine until both a cashier's and a clerk's entry retaining device are in the machine.

The general objects of the invention may be understood from the foregoing.

With these and incidental objects in view the invention consists in certain novel features of construction and combinations of parts the essential elements of which are set forth in appended claims and the preferred form of embodiment of which is hereinafter described with reference to the drawings which accompany and form part of the specification.

Figure 24:
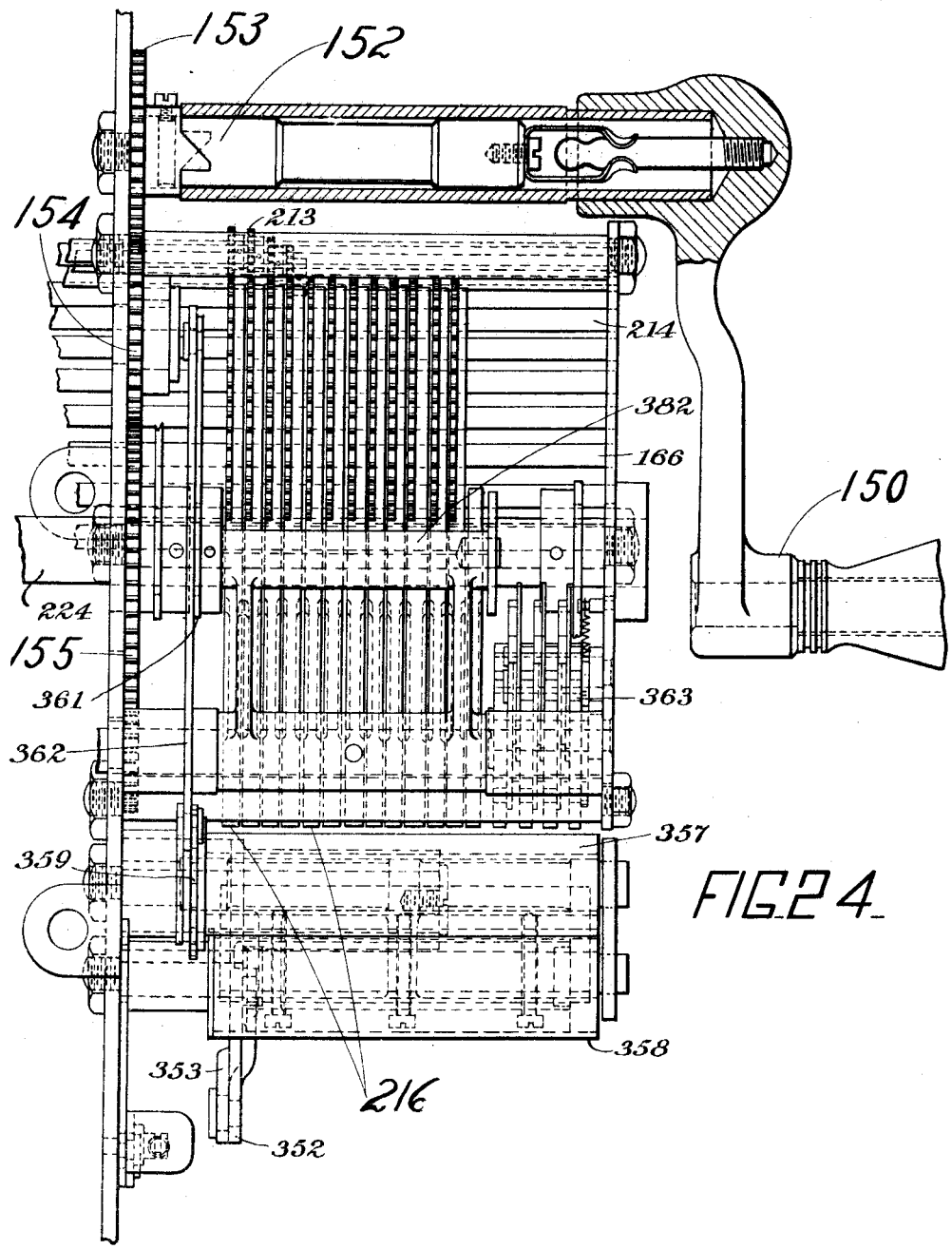

Figure 1 is a transverse vertical section taken through the cashier division of the machine. Fig. 2 is a detail in side elevation of part of the operating mechanism of the cashier division of the machine. Fig. 2^A (Sheet 9) is a detail of part of the mechanism which is shown in Fig. 2. Fig. 3 is a detail in side elevation of part of locking and latching devices of both the cashier and clerk divisions of the machine. Fig. 4 is another detail in side elevation illustrating the carriage for accumulating devices and coacting elements of the machine. Fig. 5 is a detail in side elevation of a segment gear and denominational slide of the machine coacting with denominational slides of a detachable accumulator. Fig. 6 is a transverse vertical section taken through the clerk division of the machine. Fig. 7 is a detail of a cam and pitman for actuating alining devices for segments which are positioned by identifying blades of clerk accumulating devices. Fig. 8 is a detail of a machine lock. Fig. 9 is a detail of a restoring cam for key locks. Fig. 10 is a side elevation of part of the mechanism which appears in Fig. 6. Figs. 11 and 12 are details of cams for operating devices which are shown in Fig. 10. Fig. 13 is a detail inside elevation and partly in section of the clerk subtotalizer together with alining devices and resetting mechanism therefor. Fig. 13^A (Sheet 9) is a detail of part of the differential mechanism and illustrates the carrying devices of the same. Fig. 13^B is a detail of a cam and pitman which effect the resetting of the clerk subtotalizer upon the completion of each registration. Fig. 14 is a plan of one of the subtotalizers. Fig. 15 is a detail of a cam and coacting mechanism which is related to the keyboard. Fig. 16 is a transverse vertical section of one of the detachable accumulators illustrating one of the identifying blades which are carried by the accumulators. Fig. 17 is a transverse vertical section of one of the detachable accumulators and illustrates one of the amount blades and a key which is carried by the accumulator and which serves for unlocking the machine. Fig. 18 is a left side elevation of the sales slip printer. Fig. 19 is a front elevation of the sales slip printer. Fig. 20 is a sectional view of the sales slip printer taken on the line 20—20 of Fig. 18. Fig. 21 is a detail in side elevation of a gripping device by means of which the sales slip is positioned for the second impression. Fig. 22 is a detail of the slip feed cam and pitman which also appears in Fig. 18. Fig. 23 is a detail in side elevation of a type-setting lever by means of which the class of transaction type are positioned for impressions. Fig. 24 is a front elevation of the detail printer and also illustrates how the driving mechanism may be operated by means of a crank handle. Fig. 25 is a side elevation of the detail printer. Fig. 26 is a detail in side elevation of detail strip feeding rolls. Fig. 27 is a detail in side elevation of a cam and pitman which operate printer alining devices. Fig. 28 is a detail of a cam which operates the setting mechanism for identifying number type carriers and locking and unlocking mechanism for clerk detachable accumulators.

*Detachable accumulators.*—These devices are not novel in the present invention but are here somewhat specifically described. For more complete descriptions of these devices attention is called to the following United States patent applications: Serial No. 338,502, filed Oct. 11, 1906, and Serial No. 538,470, filed Jan. 17, 1910.

Both cashier and clerk detachable accumulators are identical in principle of construction. However, it is preferable that cashier accumulators have a greater capacity in regard to amounts while the clerk accumulators have greater capacity in regard to identifying devices. Each detachable accumulator 1 (Figs. 16 and 17) is provided with a plurality of denominational amount slides 2, one or more identifying blades 3, a shouldered blade 4 by which the accumulator is retained within the machine during operations, a lock 5 for the amount slides and a spring operated guard 6 which normally closes openings 7 in the accumulator casings. The denominational slides 2 are provided with a plurality of notches 8 coacting with a pointed flange 9 of the plate 5 and the zero position of the accumulating slides is with the outermost notches 10 in engagement with the flange 9. Each denominational slide 2 is provided with a lug 11 to which is secured a spring 12 extended between the lug 11 and a pin 13 carried by frames of the accumulators. The springs 12 normally urge the denominational slides to move outward to their "nine" positions as indicated in Fig. 17.

The machine is provided with means for rocking the plate 5 so that its flange 9 will be carried away from the accumulators 2 and the machine is also provided with slides coacting with the slides 2, which are positioned according to the manipulation of the keyboard to allow the slides 2 to move outwardly more or less for the purpose of positioning these slides to correspond with the amount which is set up upon the keyboard. The plate 5 is then permitted to resume its original locking position and the accumulating devices are ejected from the machine having their denominational slides 2 positioned to represent desired amounts.

The detachable accumulating devices may, when inserted into the machine, have their blades already set to represent amounts and it is necessary then to reposition the blades so as to represent the total of the amount which was previously carried by the blades and the new amount of the registration which is being recorded. For this purpose the machine is provided with subtotalizing devices to which the amounts carried by the detachable accumulating devices are transferred and which then receive the additional amount of the transaction which is being recorded and then are operated to transfer the total to the detachable accumulators.

The above coacting devices of the machine are differently operated in the cashier and clerk divisions of the machine. In the cashier case the coöperating subtotalizer first receives an amount from a cashier accumulating device and then in addition successively receives the amounts of all transactions which are recorded while the particular cashier device is in the machine. At the time the cashier goes off duty he causes this total amount to be transferred to his accumulating device before the device is ejected from the machine. In the case of the clerk division the amounts which are carried by a clerk accumulator are transferred to the coacting subtotalizer and the subtotalizer then receives in addition the amount of a single transaction and transfers the total to the clerk accumulating device at each registration and after each registration whatever clerk accumulator is in the machine is ejected before the machine is again operated.

*Cashier division of the machine.*—When a cashier comes on duty, and before he sets up any transaction on the keyboard, he places his detachable accumulating device in a carriage 15 (Fig. 1) preparatory to causing the detachable device to come into operative relation with the machine so that if the detachable device has been previously set its setting may be transferred to the cashier subtotalizer and that it may receive the final setting of the subtotalizer when the cashier goes off duty. The carriage 15 is mounted on a pair of arms 16 and 17 which are respectively journaled on shafts 18 and 19. After the cashier accumulator is in place in the carriage it is pushed inwardly against the action of a spring 20 causing the arms 16 and 17 to rock in the direction indicated by arrow 20 until a plate 21, which is rigidly connected with the carriage 15, is in such position that its shoulder 22 may be engaged by a pin 23 (Fig. 3) of a spring operated arm 24. The plate 21 is rigidly secured to the carriage 15 by studs 26 and 27 which also serve for pivotally connecting the carriage with the arms 16 and 17. During the inward movement of the carriage the amount slides 2 and the identifying blades 3 engage coacting slides 28 and 29 in the machine, positioning the slides 28 according to the setting of the denominational slides 2 and positioning the slides 29 according to the length of the identifying blades 3. The amount slides 28, which coact with the accumulating slides of the detachable accumulators, are pivoted at their rear ends to segment gears 30 (Fig. 5). These segment gears are adapted to mesh with pinions 31 of a cashier subtotalizer 32 (Fig. 1) but normally do not mesh with the pinions and upon the inward movement of the slides 28 perform no function and are at this time merely differentially set according to the setting of the denominational slides of the cashier accumulating device. After the two sets of slides 28 and 29 have been differentially set and the carriage 15 is at rest in its inner position the cashier draws a lever 33 (Figs. 1, 2 and 3) downwardly thereby causing a shaft 34, which carries the lever, to rotate about 60 degrees in the direction indicated by arrow 35. This movement of the lever causes the differential setting of the segment gears 30, by returning the same, to be transferred to the cashier subtotalizer 32, the mechanism operating so that the subtotalizer is meshed before the return of the segment gears and unmeshed when the segment gears are again in their home positions. This mechanism will be described in detail farther on but first locking devices controlled by the cashier accumulating devices will be described. The purpose of these locking devices is to prevent the operation of the lever 33 except when a cashier accumulating device is in the carriage 15 and the carriage is latched in its inner position. The carriage supporting arm lever 16 (Fig. 3) carries an arm 36 which extends rearwardly over a pin 37 on a lever 38 which is pivoted loosely upon the shaft 19. At its rearward end the lever 38 is connected by a spring 39 to a pin 40 on a lever 41 which is loosely pivoted upon a shaft 42 and is provided with a lug 43 for coacting with toothed segments 44 which are loosely pivoted upon a shaft 45 and connected by pins 46 with the blades 29 which coact with the identifying blades 3 of the accumulating devices. When the carriage 15 is pushed inwardly the arm 36 causes the rearward end of the lever 38 to be rocked upwardly thereby tensioning the spring 39 and through the spring tending to pull the lever 41 upwardly so that a pawl 47, which is carried by the lever 41, will be moved out of the path of movement of a pin 48 which is carried by an arm 49. This arm 49 is carried by a shaft 50 which shaft also carries the arm 24 provided with the pin 23 coacting with the shoulder 22 of the plate 21. A tension spring 51 is extended between the arm 24 and a hook which is secured to the base of the machine but this spring is normally prevented from rocking the arms 24 and 49 by a shouldered arm 52 fast on the shaft 50, the shoulder of which normally rests on an edge 53 of the plate 21. When the carriage reaches its inner position a notch 54 in the plate 21 arrives below the shoulder of the arm 52 and the shaft 50 will be permitted to rotate a slight distance under the action of the spring 51 and far enough to bring the pin 23 over the shoulder 22 thereby locking the carriage 15 in its inner position, but provided pawl 47 is not in the path of pin 48. In order that the pawl 47 may be moved out of the path of pin 48, the segments 44 must be set so that interdentals of the same are opposite the tooth 43. It is, therefore, impossible to lock the carriage in its inner position until the segments 44 have been properly alined.

The home positions of the segments 44, as shown in Fig. 3, are not the true zero positions of the segments. The true zero positions of the segments are with the farthest notches to the right in the arc of movement of the tooth 43. If any of the segments are not either in their zero positions or properly set in higher positions, the relation between the segments and the alining tooth 43 will be such as illustrated by Fig. 3 and it will then be impossible for the arm 41 to rock upwardly because the spring 39 is not of sufficient strength to cause the alining of segments 44. A detachable accounting device must be in the carriage in order to cause the segments 44 to be moved out of the position in which they are shown in Fig. 2. It is, therefore, impossible to operate the lever 33 when a detachable accumulating device is not in the carriage. Lever 33 cannot be operated until the carriage 15 is latched in its inner position as the shaft 50 carries an arm 56 which extends across the front of a pin 57 carried by an arm 58 on a sleeve 59 loose on the shaft 50. As shown in Fig. 3 the stud 57 is retained in normal engagement with the arm 56 by a spring which is connected at one end to the lower end of the arm 58 and at its opposite end to the lower end of arm 56. The sleeve 59 carries an arm 60 which is provided with a lug 61 coacting with a lug 62 on the cashier operating lever 33. When the shaft 50 is rocked at the time of locking the carriage in its inner position the arm 56, through engagement with the pin 57, causes the sleeve 59 to be rotated far enough to carry the lug 61 out of the path of movement of the lug 62. The lever 33 may then be swung downwardly for the purpose of transferring an amount from the cashier accumulating device to the cashier subtotalizer.

Referring to Fig. 15 it will be seen that the blades 3 of the detachable accumulators are provided with notches. In order to unlock the amount slides 2 it is necessary to bring all of the notches 63 under a flange 64 of the locking plate 5 so that the locking plate may be rocked upon its pivot 65 for the purpose of withdrawing the flange 6 from the amount slide teeth 10. The identifying blades 3 may be of five different lengths to correspond with five different positions to which the segments 44 may be set. The blades 3 are normally not quite in true alinement and when alined with notches 63 come into alinement with the flange 64. The object of having the notches 63 normally out of alinement with the flange 64 is to retain normally the amount slides 2 in their set positions and to prevent manipulation of these slides when the accumulator devices are not in the machine. The segments 44 together with the slides 29 which are attached to the segments, are normally held in their home positions by springs 66 (Fig. 3), and are normally out of alinement or exact correspondence with the identifying blades 3 of the cashier accumulators. This is to permit alinement of the segments 44 to cause the alinement of the identifying blades 3. The alinement of the segments 44 is effected by means of pawls 67 which are actuated by the lever 33. The lever 33 is rigid with a segment gear 68 (Fig. 2) meshing with an intermediate pinion 69 which in turn meshes with a small segment gear 70 carried fast on shaft 45. The intermediate gear 69 is carried by a stub-shaft 71 and has secured thereto an arm 72 which is connected by a link 73 (Fig. 1) to an arm 74 fast on a shaft 75. The shaft 75 carries cams 76 (Fig. 3) and through the cam connection upon the downward movement of the lever 33 the shaft is rocked far enough to cause these cams to rock the alining pawls 67 into engagement with the teeth of the segment gears 44 and thereby aline the segment gears and through the blades 29 aline the identifying blades 3 of the cashier accumulator. If the alining device 43 is in its upper position one of the teeth 105 between the alining teeth 55 will be in the arc of movement of the nose of the pawl 67 and the alinement of the segments 44 cannot be accomplished and, as previously stated, the upward movement of the alining device 43 also carries the pawl 47 out of the path of movement of the pin 48 and the lever 33 may then be operated.

After the identifying blades 3 are alined it is possible to unlock the amount slides 2 simply by rocking the plate 5 out of engagement with the amount slides and it is necessary to unlock the accumulating slides 2 so that the slides 28 (Fig. 5) may be returned to zero position with the segment 130 gears 30 when their settings are transferred to the subtotalizer pinions. The unlocking of the amount slides 2 is also accomplished by the downward movement of the lever immediately after the alinement of the segments 44 and the meshing of the totalizer pinions with the segments 30. The shaft 45 which carries the segment gear 70 also carries a cam 77 (Fig. 1) through a slot 78 in which extends a roller 79 carried by a pitman 80. The forward end of the pitman is pivoted to an arm 81 on a shaft 82, which also carries an arm 83 (Fig. 5) extending into a cut 84 in a plunger 85 which is slidably mounted in a bracket 86. The downward movement of the lever 33 causes the plunger 85 to enter an opening 87 (Fig. 16) of the cashier detachable accumulator. It is projected downwardly far enough to rock the plate 5 out of engagement with the amount slides 2, as indicated in Fig. 5. While this is occurring another cam 88 (Fig. 2), which is carried by the shaft 45, causes the subtotalizer 32 to be rocked into mesh with the segment gears 30 which are pivotally connected to the amount slides 28 and when the amount slides 2 of the accumulating device are unlocked springs 90 (Fig. 5) cause the segment gears 30, blades 28, and amount blades 2 of the detachable accumulator to be returned to their initial or zero positions. As at this time the subtotalizer 32 meshes with the segment gears 30, the pinions 31 of the subtotalizer will be rotated according to the extent of return-movement of the segments 30, in turn corresponding to the setting of the amount blades 2 of the accumulator at the time it was inserted into the machine.

In order to aline the segment gears 30 in the positions to which they are moved by the accumulator, the shaft 45 carries a cam 179 in which rides a roller on a pitman 180. This pitman straddles the shaft 45 and is connected by an arm 181 to a shaft 178, on which are rigidly mounted a plurality of alining arms 177, one for each of the segments 30. It will be seen from Fig. 2 that the groove in cam 179 is so shaped as to reciprocate the pitman almost immediately after the handle 33 starts to descend. This reciprocation will aline the segment gears 30 just previous to the meshing of the totalizer 31 therewith and then immediately release these segments so that they may be operated to transfer the amount on the accumulator to the totalizer.

Race 91 in the cam 88 is so formed that at the completion of the downward movement of the lever 33 it will cause the subtotalizer to be again unmeshed from the segment gears 30. The particular manner in which the cam 88 rocks the totalizer 32 into and out of mesh is as follows: The cam operates a pitman 92 which carries a roll 93 extending through the race 91 of the cam. At the beginning of the downward movement of the lever 33 the pitman is drawn toward the shaft 45 thereby rocking a lever 94 around its pivot 95 in the direction indicated by an arrow 96 (Fig. 2). The upper end of the lever 94 is pivotally connected by a link 98 with an arm 99 of a subtotalizer carrying frame 100 which is journaled upon a shaft 101. The rocking of the lever 94, therefore, causes the subtotalizer 32 to be meshed with the segment gears 30. The return of the pitman 92 at the completion of the downward stroke of the lever 33 causes the subtotalizer to be returned to its unmeshed position but it then is so set as to represent the amount which had been transmitted to it from the detachable accumulator. The lever 33 is permitted to remain in its lower position until all registrations which the particular cashier records during a certain period are completed. During this period the subtotalizer pinions are successively rotated in a forward direction by segments 167 (Fig. 1) so as to represent the total of all registrations which are made while the particular cashier's detachable accumulator is in the machine. The manner of operating segments 167 will be described further on. When the cashier goes off duty the lever 33 is lifted to its original position effecting a reverse operation of the totalizer 32 and in this manner transmitting the differential setting of the subtotalizer to the amount slides of the cashier's accumulator. This is accomplished as follows: By reversely rotating the totalizer pinions to their zero positions while the same are in mesh with the segment gears 30 (Fig. 5) the segment gears are differentially rocked rearwardly according to the extents of rotation of the totalizer pinions at this time. As the slides 28 are pivoted to the segments these slides are drawn rearwardly thus permitting the amount blades 2 of the detachable accumulating device to follow the slides under the action of their springs 12, coming to rest in positions which correspond to the extents of rearward rocking of the segments 30. The subtotalizer is reset by causing the subtotalizer shaft to make one rotation in the direction indicated by an arrow 97 (Fig. 2) while the subtotalizer is in mesh with the segments 30. The subtotalizer shaft is provided with a plurality of notches 108, such as indicated in Fig. 13, which is a detail of the subtotalizer of the clerk side of the machine. Upon the backward rotation of the subtotalizer shaft the notches engage pawls which are carried by the totalizer pinions picking these pinions up at whatever positions they may be in and causing the same to be reset to zero.

In order backwardly to rotate the subtotalizer shaft it is provided with a broad pinion 109 which is adapted to mesh with a segment gear 122 (Fig. 2). This gear, of course, meshes with pinion 109 when the totalizer is rocked into mesh with the segment gears 30 and upon the downstroke of the lever 33 the totalizer shaft is rotated in such direction as to carry the notches 108 away from the pawls of the totalizer pinions, then when the lever 33 is lifted, during which time the totalizer is again in mesh with the segments 30, the totalizer shaft is rotated toward the pawls carried by the totalizer pinions, picking the same up at whatever position they may be in and returning the pinions to zero. When the lever 33 arrives at its upper position the totalizer is again rocked out of mesh. It may be seen from Fig. 2 that the race 91 in the cam 88 is suitably formed at each end for rocking the totalizer out of mesh at the extreme positions of the lever. In order that the notches 108 of the totalizer shaft will not interfere with the forward rotation of the totalizer pinions when in mesh with the actuating racks 121, a rigid frame 123 (Fig. 14) having a slot 124 inclined to the direction of movement of the totalizer, is provided. A pin 125, which is carried by a collar 126 riding on an annular groove in the totalizer shaft, extends through this slot and when the totalizer is rocked out of mesh with the segments 30 the inclined slot in the frame 123 engages the pin 125 and causes the totalizer shaft to be moved in a longitudinal direction for the purpose of carrying the notches 108 away from the pawls carried by the totalizer pinions, thereby permitting free forward rotation of the pinions. A type of resetting mechanism substantially similar to this is described in the before mentioned application, Serial No. 538,470.

The cashier detachable accumulator is latched to the carriage 15 and released from the same in the following manner: The carriage is provided with a pawl 127 (Fig. 5) which is pivoted upon a stud 128 on the carriage and is adapted to coact with the shouldered blade 4 of the accumulator.
When the accumulator is moved into the carriage the beveled end of the pawl 127 enters the accumulator below the guard, thus forcing the same upwardly away from openings 7 in the accumulator; at the same time the point of the pawl engages the beveled end of the blade 4 causing the pawl to be rocked upwardly until the shouldered end thereof passes the coacting shoulder of the blade 4 when the pawl springs downwardly latching the accumulator to the carriage. Further pressure upon the rear end of the accumulator causes the carriage 15 to be swung inwardly at which time the rear end 129 of the pawl rocks a pawl 130 out of its path. The pawl 130 is pivoted upon a tie rod 131 and is held in its normal position, as shown in Fig. 5, by spring 90 and is limited in its forward movement by a lug 132 which is carried by an immovable arm fixed to the tie rod 131. The pawl 130, therefore, upon the outward movement of the carriage 15 by engagement with the end 129 causes the pawl 127 to be rocked out of engagement with the shouldered blade 4, thereby permitting the accumulator to be ejected from the machine by a spring actuated dog 133, the spring of which is indicated at 134 and is extended between the pawl and a short arm 135 on the stud 128. This spring is, therefore, tensioned upon the insertion of the detachable accumulator through its engagement at this time with the dog 133 and the pawl 127.

For the successful operation of the machine means are provided for preventing the operation of the machine until a cashier's accumulator is in operative relation with the machine and the lever 33 is in its lower position. This means consists of a depending arm 136 (Fig. 2) fast on a shaft 137, which shaft is part of the locking mechanism of the register and to unlock the register this shaft is rotated slightly in the direction of arrow 138 and is held in its moved position while the driving mechanism is operating. The lever 33 carries a pin 139 which extends across the rear edge of the lever 136 and, therefore, blocks movement of the shaft 137 when the lever 33 is in its upper position and also prevents movement of the lever from its lower position when the shaft 137 is in its moved position during the operation of the driving mechanism as at this time lower end 140 of the lever 136 is above the pin 139.

The rocking of shaft 137 is normally blocked by three devices, namely, the pin 139 on the lever 33; an arm 141 (Fig. 3) which is carried by a shaft 142 (Fig. 6) in the clerk side of the machine and in line with shaft 50, and which coacts with an arm 143 fast on the shaft 137; and an arm 144 (Fig. 1) fast on a shaft 145 which coacts with an arm 146 fast on the shaft 137. The arm 141 is rocked out of the path of arm 143 when the accumulator carriage of the clerk side of the machine is latched in its rear position by the rocking of shaft 142, this shaft being rocked by the clerk's accumulator, as is shaft 50 by the cashier's accumulator. The arm 144 (Fig. 1) is rocked downwardly to permit movement of the arm 146 by the depression of a motor key which is not illustrated in the drawings but is constructed to cause the shaft 145 to rock slightly in the direction of arrow 147. The rocking of shaft 137 causes the closing of a motor switch through a link 148 (Fig. 6)

which connects an arm 149 of the switch mechanism with an arm 170 fast on the shaft 137. The link 148 is also connected to an arm 171 fast on a shaft 172 which shaft carries a shouldered arm 173 (Fig. 8) coacting with a locking disk 174 on the drive shaft 105. The depression of keys causes slight upward movements of slides 175 (Fig. 6) while the keys are being depressed, but when they reach depressed position the slides 175 return to normal position, as shown in Fig. 6. These slides coact with flanged arms 176 fast on the shaft 137, thus preventing the rocking of the shaft and the consequent operation of the machine while an amount key is being depressed.

So far it has been stated that the downward movement of the lever 33 causes the return of the segments 30 to their zero positions but the particular mechanism employed has not been pointed out. This mechanism is illustrated in Figs. 2 and 2A. The shaft 45, which is oscillated upon the operation of lever 33 by the gearing shown in Fig. 2, carries a pair of arms 182 and 183 which are respectively provided with pawls 184 and 185. These pawls are urged by springs normally to assume the position with respect to their carrying arms which the pawl 184 has in Fig. 2A. Upon the downward movement of the lever 33 a shoulder 186 of pawl 184 engages an arm 187 of a lever 188 which is loosely pivoted upon the shaft 45, rocking this lever in the direction indicated by arrow 189. The lever 188 carries a stud 190 which at this time engages rails 110 of the segments 30 (Fig. 5), picking these segments up in whatever position they have been moved to upon the insertion of the detachable accumulating device and returning the same to zero. The interval allowed at the beginning of the rocking of the shaft 45 before engagement of the pawl 184 with the arm 187 is for the purpose of providing time for the action of cams 179 and 88 (Fig. 2). The stud 190 also engages edge 191 of a downwardly extending arm 192 of the restoring segment gear 122 and therefore, causes this segment gear to rock with the arm 188.

When the segment gears 30 have arrived at their zero positions it is necessary to disconnect the pawl 184 from the arm 187 so as to permit a slight independent further rocking of the shaft 45 to permit the arm 88 to rock the subtotalizer out of mesh. This is accomplished by part 195 causing the pawl 184 to be rocked out of engagement with the arm 187. Upon returning the lever 32 to its original upper position a shoulder 196 of the pawl 185 engages a shoulder 197 of the downwardly extending arm 192 of the restoring segment gear 122 thereby causing the return of the segment gear, at which time the segment gear accomplishes the resetting of the subtotalizer. The edge 191 of the arm 192 at this time engages the stud 190 returning the arm 188 to its original position. For the purpose of permitting slight independent movement of the shaft 45 after the segment gear 122 arrives at its zero position, the pawl 185 is tripped out of engagement with the shoulder 197 by trip 198 which is secured to the rod 135. The slight independent movement of the shaft 45 at this time effects the unmeshing of the subtotalizer. The segment gear 122 is alined in its home and moved positions by a spring actuated pawl 199 which is pivoted loosely upon the rod 135 and coacts with notches in the arm 192.

Full stroke mechanism is provided for the lever 32 as indicated in Fig. 2. This mechanism consists of a two-way pawl 371 which is carried by the lever 32 and coacts with a full-stroke rack 372. The angular position of the pawl is reversed upon the lever 32 reaching the end of its stroke by pins 373. The pawl is retained in the positions to which it is rocked by a spring pressed pawl 374.

The machine is provided with the usual cash drawer which is caused to move to its open position whenever a registration is made. Means are also provided for causing the cash drawer to move to its open position whenever the cashier lever 35 is in its upper position. When a cashier goes off duty he rocks the lever 35 to its upper position thus causing the cash drawer to open so that he may have access to the cash which was taken in while he was on duty. The cash drawer is not indicated in the drawings but operating mechanism for the same is shown in Fig. 1. The drawer latch carries a pin 375 which extends over an arm 376 on a sleeve 377, surrounding shaft 300. This sleeve carries an arm 378 which is pivoted to a pitman 379. The pitman 379 carries a pin 380 extending across one edge of a cam 381 which is carried by the shaft 75. It was previously stated how the shaft 75 is rocked by operation of lever 32. When the lever 32 is moved to its upper position the cam 381 causes the pitman 379 to move forwardly to the position in which it is shown in Fig. 1, and the movement of the pitman causes the drawer latch to be lifted, thereby releasing the cash drawer.

During the time that registrations are being carried in the machine and when both the cashier and clerk subtotalizers are successively added to the cashier totalizer is rocked into and out of mesh with the racks 121 of the subtotalizer mechanism at the proper times by cams 386 (Fig. 1) on rod 185. The rack 380 acts upon a roller 387 of a pitman 400 pivoted at its lower end and when actuated rocks this lever around its pivot 402 on the pitman 92 to carry the cashier subtotalizer into and out of mesh with the racks 121. The lever 33 is at such times in its lower position and movement of the pitman 92 is prevented by its actuating cam.

*The clerk's division of the machine.*—The clerk division of the machine is illustrated in the sectional views (Figs. 6, 10 and 13). The carriage for the detachable accumulators and connecting devices of the machine are identical with that illustrated in Figs. 4 and 5. The inward movement of a clerk's accumulator effects the differential setting of segment gears 30 through slides 28 but the differential setting of the segment gears is transferred to the clerk's subtotalizer 115 by the operating mechanism of the machine, while on the cashier side of the machine the differential setting is transferred by means of the operating lever 33. The segment gears 30 are provided with downwardly projecting tails 110 which are moved more or less into the path of movement of a rod 111 (Fig. 10) when the segment gears are shifted by the inward movement of the slides 28. The rod 111 is carried by a pair of arms 112 which are pivoted loosely upon the shaft 45 and one extends upwardly to a pitman 113 which is actuated for the purpose of returning the segment gears 30 to zero positions by a cam 114 (Fig. 11) carried by the drive shaft 106. The pitman returns to normal position under spring action. Clerk subtotalizer 115 is held in mesh during the return of the segment gears 30, so as to receive differential movement from the same by a cam 116 (Fig. 11) which is carried by the drive shaft 106 and actuates a pitman 117, which is connected to a frame 118 carrying the subtotalizer, by an arm 119.

It will be seen that the cam 116 is provided with a race 120 shaped to cause the pitman 117 to be reciprocated twice during each rotation of the drive shaft 106. This is for the purpose of first rocking the subtotalizer into mesh with the segments 30, holding the same in mesh long enough to receive the differential movement of the segments and then carrying the subtotalizer out of mesh with these segments and into mesh with racks 121 which receive differential movement from the keyboard. The subtotalizer is held in mesh with the racks 121 until the amount which is set up on the keyboard is added to the subtotalizer and then it is returned into mesh with the segments 30 for the purpose of transferring the total amount which it received, to the segments 30 and through these segments to the clerk accumulator. The subtotalizer is finally restored to the position in which it is shown in Figs. 10 and 13.

The subtotalizer carrying frame 118 extends downwardly of the shaft 172, as indicated in Fig. 13, and carries a pin 229 coacting with a locking device 230. This device positively holds the totalizer in mesh with the segment gears 30 at the proper time and in mesh with the racks 121 at the time these racks are actuated. The locking device for this purpose is mounted upon an oscillating shaft 231 and is provided with slots 232 and 233 coacting with the pin 229. The shaft 231 is oscillated as required by a cam 234 (Figs. 10 and 12) which coacts with a roller 235 on a pitman 236 pivoted at its lower end to an arm 237 fast on shaft 231.

Fig. 13 illustrates the action of pawls 238 which prevent accidental rotation of the subtotalizer pinions. These pawls are pivoted upon the carrying frame 118 and are provided with L shaped slots 239 through which extends a fixed stud 240. When the subtotalizer is rocked into mesh with the racks 121, parts 241 of the slots 239 engage the stud 240 causing the pawls to be rocked out of mesh, and when the subtotalizer is rocked into mesh with the segment gears 30 parts 242 of the slots cause the pawls to be rocked out of mesh. The subtotalizer is reset after being successively added to by the segment gears 30 and the racks 121. Before resetting it is meshed with the segments 30 and is then actuated in a manner similar to the cashier subtotalizer when it is reset. A restoring segment gear 243, which meshes with the broad pinion 109 of the clerk subtotalizer, is actuated by a cam 244 (Fig. 13ᵃ) which coacts with rolls 245 and 246 on a pitman 247. This pitman is pivoted at its forward end to an arm 248 on a sleeve 249 (Fig. 13) loose on shaft 45 and which carries the segment gear 243. The cam 244 rotates in the direction indicated by arrow 250 and one of these rolls extends into a race 251 of the cam while the other roll is engaged by a shoulder on the periphery of the cam, the operation of the cam being first to push the pitman in one direction and then to push the pitman back to its original position. The subtotalizer shaft is thereby oscillated causing the notches 108 to engage pawls 252 of the totalizer pinions and reset the same. Upon the inward movement of the slides 28 at this time, the accumulating slides of the clerk detachable accumulator are positioned according to the total amount accumulated by the clerk subtotalizer and are then locked in their set positions and ejected from the machine in the same manner as was described in connection with the cashier subtotalizer. The locking and unlocking mechanism for the clerk detachable accumulators is, however, operated from the drive shaft 106. Locking plates 5 of clerks' accumulators are actuated by a plunger 382 (Fig.

6) which is mounted similarly to plunger 85 (Fig. 5) of the cashier side of the machine. Carrying arm 383 for plunger 382 is secured to shaft 384. This shaft carries a downwardly extending arm 385 to which is pivoted a pitman 386. The pitman 386 is provided with a roll 387 (Fig. 28) which extends into race 388 of cam 206 on drive shaft 106.

The restoring segment gear 243 (Fig. 13) is held in its home and moved positions at the time of meshing and unmeshing of the subtotalizer, by a pawl 253, which is pivoted upon the shaft 209 and at the proper times is caused to engage pins 254 and 255 of a segment 256 which is rigid with the segment gear 243. The pawl 253 is actuated by a cam 257 which is carried by the drive shaft 106 and coacts with a roller 258 on the pawl.

*Driving mechanism.*—The drive shaft 106 is caused to make one rotation upon each operation of the machine. It carries all of the principal operating cams and is driven either by means of a crank handle 150 (Fig. 24), or a motor 151 (Figs. 1 and 6). The motor is controlled by a motor key and for the purpose of this specification it is merely pointed out that upon the depression of the motor key the motor is permitted to operate long enough to effect a single rotation of the drive shaft 106. If the machine is operated by means of crank 150 two rotations of this crank are required to cause one rotation of the drive shaft 106. A shaft 152, which carries the crank, carries rigidly a pinion 153 which meshes with an intermediate gear 154 meshing with a gear 155 fast on the drive shaft 106.

*The keyboard.*—The keyboard mechanism which is employed in this machine is the subject matter of a patent application Serial 502,541. The keyboard mechanism is described in detail in that application but may be briefly described here. The keys 1641 are arranged in rows or banks as is customary and each key carries integral therewith or fast thereto two projecting lugs or flanges 1642, which, when the key is depressed, engage the opposite sides of the pointed ends of levers 1643. As shown in Fig. 6, these levers are all substantially similar in shape and they are all pivoted at their bottom ends to a bar 163 hung from parallel rods 1644. At their upper ends these bars 163 are provided with slots 162 normally engaging a rod 161 carried by two arms 160 which are fast on a shaft 159. At each operation of the machine the shaft 159 is rocked by a cam 156 (Fig. 15), which, as shown, reciprocates a pitman 157 connected to the shaft 159 by a crank arm 158. Thus the slides or bars 163 are moved a constant distance at each operation of the machine. Passing through the slots in the key-controlled levers 1643 are headed pins 1644 positioned in accordance with the value of the key to which the particular lever 1643 corresponds. These headed pins 1644 are all fast on a triangular frame 1645 provided with rack teeth 164 on its lower side. It will be evident that when any key 1641 is depressed the pointed end of the corresponding lever 1643 will be held between the key flanges 1642 and so provide a fulcrum for the corresponding lever 1643. Then, when the bar 163 is raised by the cam 156, the lower end of the key lever 1643 will be raised through a constant distance and the triangular arm 1645 then elevated an amount proportional to the value or power of the depressed key. Thus a differential movement of the racks 164 is attained. The keys are locked against depression during the operation of the machine by the flanged arms 176 (Fig. 6) which are carried by shaft 137. It was previously stated how the shaft 137 was rocked to permit the operation of the machine. The rocking of the shaft causes the arms 176 to be rocked upwardly so that their flanges are in the path of movement of key detents 175 and as movement of the key detents is thus prevented, it is impossible to depress a key during the operation of the machine. The arms 176, together with the shaft 137, are restored to their original positions by a cam 389 (Fig. 9) which, at the desired time, engages a shoulder 390 on the link 148, thus pushing the link back to its original position. This link being connected to an arm 170 on the shaft 137 thereby rocks the shaft back to its original position.

*Differential mechanism.*—The keys control movement of racks 164 (Figs. 6 and 10) meshing with intermediate segment gears 165 which carry the racks 121 with which the clerk subtotalizer is adapted to be meshed. The segment gears 165 are connected by pinions 169 fast on shafts 166 to another set of segments 167 (Fig. 1) for which purpose each set of segments 165 and 167 are provided with rack teeth 168 meshing with the pinions 169. The segments 167 also carry racks 121 with which the cashier subtotalizer 32 is adapted to be meshed. By the above mechanism the differential movement of the racks 164 is communicated to both subtotalizers.

Fig. 13ᴬ (Sheet 9) illustrates the transfer or carrying devices of the differential mechanism. These devices are the same on both cashier and clerk sides of the machine and are arranged to cause additional units of movement of any racks 121 whenever totalizer pinions of next lower order pass from nine to zero. The segment gears 167 and 261 which extend through slots 262 in the racks 121. These racks are urged to move an extra unit in a forward direction by springs 263 but are normally prevented by pawls 264 which are carried by the segment gears and which are provided with pins 265 coacting with shoulders 266 on the racks 121. The pawls 264 are held in engagement with the shoulders 266 by springs 267 and are provided with shoulders 268 which are located in a vertical plane with slides 269 which are also carried by the pins 260 and 261 and are slightly movable toward the shaft 224 but are held in their outer positions by the spring pressed pawls 264. The slides 269 are in vertical planes with transfer pawls 270 (Fig. 13). These pawls coact with transfer cams 271 of next lower order than the slides 269 which coact with their respective pawls 270. When any subtotalizer pinion passes from nine to zero its respective transfer cam rocks one of the pawls 270 upwardly thereby pushing the respective slide for this pawl toward the shaft 224 and by this means rocking a pawl 264 out of engagement with a shoulder 266 of one of the racks 121. The rack then springs forwardly the extra unit of movement as limited by the slots 262. It may be seen from the above that carrying operations occur at precisely the moments at which they are required. Carrying devices are usually operated after the differential mechanism comes to rest but by the carrying mechanism of the present invention a saving of time is accomplished, as the carrying devices operate simultaneously with the differential mechanism. The racks 121, if out of their normal position because of transferring, are restored at the completion of the operation of the machine by a cam 272 (Fig. 12) which actuates a pitman 273 connecting the cam with an arm 274 fast on shaft 224 and which carries arms 276 between which extends a rod 277. Upon the actuation of the pitman 273 the rod 277 is moved from the position in which it is shown in Fig. 10 to the position in which it is shown in Fig. 13A, thereby engaging at their ends 278 any of the racks 121 which have been moved an additional unit and returning the same to normal position, thus permitting the pawls 264 to return to normal position and retain the racks as finally set. For the purpose of preventing movement of the segments 165 and 167 and for preventing undue strain upon pawls which aline these segments, upon restoring of the transfer devices, the following means are provided for rigidly holding the alining devices in engagement. The devices which aline the segments are the ones which aline the type segments of the printer, which segments are geared to the segments 165 and 167. One of these devices 282 is shown in Fig. 25. It is connected by a pin to a pitman 281 which is slidably mounted on shaft 224 and is provided with a roll 283 coacting with a cam 284 on shaft 224. When the shaft 224 is rotated for the purpose of restoring the transfer devices the cam 284 rocks into engagement with the roller 283 and thereby rigidly holds the alining devices 282 in engagement with the type carriers.

*Type setting mechanism for identifying devices of the detachable accumulators.*—Type carriers which are controlled by the identifying devices of the detachable accumulators could be differentially set as desired upon the instrokes of the carriage 15 through direct engagement with the identifying blades of the accumulators, but it is desired to reduce the resistance as much as possible to the instrokes of the carriage as they are operated by hand. Accordingly power is supplied for setting these type carriers from the drive shaft of the machine. The slides 29 (Fig. 4), which are differentially positioned by the identifying blades in the detachable accumulators, are pivotally connected at their rear ends to the serrated segments 44 and accordingly serve to position differentially these segments. Each segment is provided with a slotted arm 200 through which extends a roll 201 carried by a link 202. At the side of each segment 44 is a segment gear 203 which is provided with a heart-shaped opening 204 through which one of the rolls 201 extends. Upon the rotation of the drive shaft 106 all of the links 202 are drawn rearwardly far enough to bring the rolls 201 into the outer ends of slots 205 and as at this time the segments 44 are locked in their moved positions the engagement between the rolls 201 and the edges of the heart-shaped openings 204 in the segment gears 203 will cause the segment gears to be differentially positioned according to the differential setting of the segments 44. The links 202 are moved rearwardly by a cam 206 (Fig. 10) which is carried by the drive shaft 106 and controls the reciprocation of a pitman 207 which is secured at its lower end to an arm 208 fast on shaft 209. This shaft carries rigidly arms 210 (Fig. 6) which are pivoted at their upper ends to the links 202. The segment gears 203 mesh with intermediate gears 211 (Figs. 1 and 6) which also mesh with segment gears 212 which are connected by means of pinions 213 and shafts 214 to type carriers 215 and 216 respectively in the slip and detail printers. By the above mechanism type carriers of the two printers are set according to the lengths of the identifying blades of both detachable accumulating devices.

*Slip printer.*—Amount type carriers 217 (Fig. 18) of the slip printer are set through pinions 218 which are carried by the shafts 163 which, as previously stated, are differentially rotated by means of the differential mechanism under the control of the keyboard. The pinions 218 mesh with rack teeth 219 which are cut in the type carriers and the differential movement of the type carriers brings desired type to the printing line opposite a platen 220. For the purpose of alining the amount type carriers they are provided with teeth 225 which coact with alining pawls 226 and 227 which are mounted upon a shaft 280. The pawls 226 are rigidly secured to the shaft and are engaged and disengaged by the rocking of the shaft which is accomplished through a pitman 291 (Fig. 27) which is pivoted to an arm 292 fast on the shaft 280 and is provided with a roll 293 coacting with a cam 294 on drive shaft 106. The pawls 227 are loosely mounted upon the shaft 280 and are held in engagement with the alining teeth of the type carriers by springs 285. The pawls 227 are spring actuated because these particular pawls coact with alining teeth of the date carrying wheels which are set by knurled heads carried by shafts 286 which shafts carry gears 287 meshing with segment gears 288 which are integral with the dating wheels. The cashier identifying numbers or initials are printed at two points upon the slips and for this reason the slip printer is provided with an additional set of identifying type 289. These type are set through the train of gears 290, 291, 292, and 293. The gears 293 are carried by two of the shafts 214 the differential rotation of which was previously described. A special type carrier 294 (Fig. 20) is provided in the slip printer which is set by the operator by a lever 295 (Fig. 23). This lever is pivoted at 296 to the machine frame and is connected by a link 297 with an arm 298 on a stub shaft 300. This shaft carries an arm 301 which is connected by a link 302 (Fig. 18) to an arm 304 on a sleeve surrounding shaft 305 and this sleeve carries the special type carrier 294, therefore movement of the handle 295 causes a corresponding movement of the type carrier. A downwardly projecting tail 306 of the arm 304 is merely for the purpose of coacting with a stop so that the movement of the lever 295 is limited. The lever 295 is alined in its different settings by a spring actuated slide 307 (Fig. 23) which coacts with notches in the arm 298.

Impressions are effected by means of platens 220 and 308 (Fig. 18). The platens are respectively pivoted upon studs 309 and 210 and by their own weight normally rest in the positions in which they are shown in Fig. 18. The platens are actuated by springs 311 which are extended between a pin 312 and pitmen 313 and 314. These pitmen carry rollers 315 coacting with cams 316 on the drive shaft 106. Upon the operation of the machine, when cut-away parts of the cams arrive opposite the rollers 315, the pitmen spring toward the shaft under the action of their springs 311, thereby rocking arms 317 which are rigid with arms 318 pivoted upon the studs 309 and 310 and which engage lugs 319 of the platen carrying arms and thereby cause the platens to be thrown upwardly and effect the impression. The arms 317 carry rubber cushions 320 coacting with fixed studs 321. The cam 316, which controls the operation of pitman 313, is provided with two cut-away parts so that the pitman will operate twice upon each operation of the machine, for the purpose of effecting two impressions upon inserted sales slips. The sales slip is automatically shifted between impressions so that impressions will appear upon different parts of the slip, the means for shifting the sales slip being illustrated in Fig. 21. The device shown in this figure consists of a slide 322 which carries a flanged clamping member 323 for clamping inserted slips to the slide 322. When slips are to be printed they are placed between plates 324 and 325 coming to rest with their inner edges between flanges 326 and 327 of the clamp 323 and the slide 322. The clamp 323 is normally held in unclamping position by a shoulder 328 of cam 329 which shoulder normally engages a roller 330 on a pitman 331. This pitman is pivoted to an arm 332 on a stud 333 upon which is also mounted an arm 334 and when held in the position in which it is shown in Fig. 21 causes a roll 335 on arm 334 to engage a member 336 which is the joint for a pair of toggle arms 337 and 338. The arm 337 is pivoted to the slide 322 and the arm 338 is pivoted to the clamp 323. Upon the operation of the machine as soon as the roll 330 on the pitman 331 is free of the shoulder 328 of the cam, a spring 339 pulls the member 336 to the right, thereby drawing the clamp 323 downwardly into clamping position. The slide 322 is moved to the left at the proper times for shifting the sales slip by cam 329 (Fig. 22) which, for this purpose, is provided with a race 340 coacting with a roll 341 on a pitman 342. This pitman is connected by arms 343 and 344 (Fig. 21) to a lever 345 which is pivoted at 346 and at its upper end is forked over a pin 347 on the slide 322. This slide is guided in its movement by a slotted bracket 348.

*Detail strip printer.*—The detail strip printer is illustrated in Figs. 24 to 26 inclusive. It will be seen from Fig. 25 that the platen 350 of the detail printer is operated similarly to the platens of the check printer, the platen arm being provided with a lug 351 coacting with an arm 352 which is pivoted to a spring actuated pitman 353 carrying a roll 354 coacting with a cam 355 on the drive shaft 106. The detail record paper 356 is fed by the rolls 357 and 358. The roll 357 carries a ratchet 359 coacting with a feed pawl 360 which pawl is actuated by the oscillating shaft 224 through an arm 361 and link 362. Fig. 26 illustrates an eccentric mounting of the feed roll 358 so that it may be easily rocked away from the roll 359. A consecutive numbering device 363 is provided in the detail printer and this device is actuated by a pawl 364 which is carried by an arm on the shaft 224.

When sales slips are not printed, a character such as the word "Cash" indicating this fact, is printed with the records upon the detail strip. The setting of the type for printing this character is accomplished by an arm 365 (Fig. 21) on a shaft 366, which shaft, through the segment gears 367 and 368 (Fig. 25), communicates movement to a type carrier 369. Upon the operation of the machine, if no slip is in place in the slip printer, the arm 365 will drop through openings in the plates 324 and 325 when the cutaway part of cam 156 (Fig. 1) arrives opposite a roll 395 on an arm 396 loosely mounted upon the shaft 366 which carries the arm 365 and connected to this shaft by a spring 397 and arm 398 on the shaft. When the arm 396 rocks downwardly it releases the tension of the spring 397 and accordingly the arm 365 is free to rock downwardly. If a slip is in place the slip will prevent the arm 365 from dropping through the opening in plate 325 and the character "Cash" will accordingly not be brought to printing position. However, the type carrier 369 is also provided with the character "Charge" which is normally at the printing line and will be printed upon the detail strip whenever a sales slip is in place in the slip printer.

The operation of the machine will probably be clear from the foregoing description, but it may be briefly recapitulated as follows: When a cashier begins a tour of duty, he first places his accumulating device on its carriage and pushes the carriage into the machine. This inward movement of the carriage causes the amount slides of the cashier's accumulator to engage the plungers 28 of Fig. 5 and adjust them to an extent corresponding to the amount, if any, previously indicated by the amount slides of the cashier's accumulator. This inward movement of the carriage causes release of the hand lever or manipulative device 33 of Fig. 1 so that it may then be manually depressed. The depression of this lever causes rotation of the shaft 45 and of the three cams carried thereby. Cam 77 of Fig. 1 causes release of the amount slides of the cashier's accumulator, cam 88 rocks the cashier's totalizer into mesh with the amount segments 30; cam 179 serves to aline these segments both before and after they are moved. The further movement of lever 33 causes the mechanism of Fig. 2^A to restore the segments 30 to normal positions thus adding to the cashier's totalizer the amount previously on his accumulating device. At the end of the downward movement of lever 33 the cashier's totalizer is restored to its normal intermediate position.

The part of the operation just described is performed by the cashier when he begins his tour of duty and irrespective of a particular transaction by a clerk. When a clerk has a transaction to enter in the machine he hands his particular accumulating device to the cashier together with any indicia of the transaction desired. The cashier inserts the clerk's accumulator in the proper carriage, depresses the amount keys of Fig. 6 corresponding to the amount of the transaction and operates the main handle of the machine, or closes the circuit for an electric motor if the machine is motor operated. By the rotation of the main operating handle or motor the driving shaft 106 is given a complete rotation. The differential racks 164 of Fig. 6 are set to the amount indicated by the depressed keys, thus rocking the segments of Figs. 6 and 10 so that they are also set at the amounts indicated on the keys. By the reverse movement of these segments the racks 121 carried thereby, add the amount of the transaction to both the cashier's and the clerk's totalizers. By the mechanism of Fig. 13 the clerk's subtotalizer is then reset to normal position, thus moving the amount segments 30 and the new amount is then transferred to the amount slides of the clerk's accumulating device and the carriage therefor released so that the accumulating device may be withdrawn from the machine. The printing mechanism of Figs. 18 and 25 are driven from the amount segments 168 and are thus set to print the amounts and characteristics of the transaction on a slip and a detail strip, therefore a printed record may be made of each transaction which may be given to the customer if desired.

While the forms of mechanism here shown and described are admirably adapted to fulfil the objects primarily stated, it is to be understood that I do not care to confine myself to any one form of embodiment of the invention here disclosed, for it is susceptible of embodiment in various forms all coming within the scope of the claims which follow.

What is claimed is:

1. In a machine of the class described, the combination with a detachable accumulating device adapted to be manually inserted into the machine, of elements in the machine positioned to be differentially adjusted when said device is inserted, a hand lever, means, released by the insertion of said detachable device, normally locking said lever, connections from said lever for restoring said elements to normal zero positions, a subtotalizer, and connections from said lever for engaging and disengaging said totalizer and said elements during a continued movement of said lever.

2. In a machine of the class described, the combination with a detachable accumulating device adapted to be manually inserted into the machine, of differential elements in the machine positioned to be differentially adjusted when said device is inserted, a hand lever, connections from said hand lever for restoring said elements to normal zero positions, a sub-totalizer, and connections from said lever for engaging and disengaging said totalizer and said elements during a continued movement of said lever.

3. In a machine of the class described, the combination with a detachable accumulating device comprising differentially adjustable slides and adapted to be manually inserted into the machine, of elements in the machine constructed to be engaged and differentially adjusted by said slides when the detachable device is inserted, a hand lever, connections from said lever for restoring said machine elements to normal zero positions, a sub-totalizer, and connections from said hand lever, including a cam, to said totalizer, said cam being shaped to engage said totalizer with said elements during their restoring movement and to disengage said totalizer at the end of such movement, by a continued movement of said lever.

4. In a machine of the class described, the combination with a plurality of amount segments and means for differentially positioning them, of a hand lever, connections having lost motion from said hand lever for restoring said segments to normal zero position, a sub-totalizer, connections from said lever including a cam shaped to engage and disengage said totalizer and said segments, by a continued motion of said lever, and key controlled differential mechanism constructed further to actuate said sub-totalizer.

5. In a machine of the class described, the combination with a detachable accumulating device, of a pivoted carriage on which said device may be manually placed, said carriage being manually movable into the machine, elements in said machine differentially positioned by said detachable device when said carriage is so inserted, a hand lever, means, released by insertion of said carriage, normally locking said hand lever, and constructed when released to lock said carriage, connections from said lever for restoring said machine elements to normal zero position, and a sub-totalizer constructed to be actuated by the restoration of said machine elements.

6. In a machine of the class described, the combination with a detachable accumulating device, of a pivoted carriage manually inserted into the machine and on which said detachable device may be manually placed, elements in the machine differentially positioned by said detachable device when said carriage is inserted in the machine, a hand lever, a sub-totalizer, connections actuated by said hand lever for transferring the movement of said elements to said totalizer, and a device, released by said carriage, normally locking said hand lever.

7. In a machine of the class described, the combination with a detachable accumulating device manually insertible into the machine and including an adjustable slide, of a pivoted element in the machine constructed to be differentially adjusted as said detachable device is inserted and including a radial slot, a toothed segment beside said pivoted element, and having a heart-shaped opening, a roller riding in both said slots and said opening with means for moving said roller, and a type carrier set by said segment.

8. In a machine of the class described, the combination with a detachable accumulating device manually insertible into the machine, and including adjustable slides and means normally locking said slides, of elements in the machine constructed to be differentially adjusted by said slides as the same are inserted in the machine, a hand lever, connections, released by the insertion of said detachable device, normally locking said hand lever, a sub-totalizer, connections from said hand lever for restoring said machine elements to zero position, and two cams actuated by said hand lever, one connected to engage and disengage said differential elements and said totalizer, and the other having connections to release said slide locking means.

9. In a machine of the class described, the combination with a sub-totalizer and two actuating racks therefor on opposite sides thereof, of a positioning lever, pitmen connected to said lever at one end and at its center, a totalizer supporting frame, a link joined to said frame and to the other end of said lever, and means for successively moving said pitmen in opposite directions, whereby to engage said sub-totalizer successively with both said actuating racks.

10. In a machine of the class described, the combination with a sub-totalizer and actuating racks therefor, of means for engaging and disengaging said totalizer and said racks, a hand lever, an arm driven by said lever and carrying a pawl constructed to operate said actuating racks, stationary devices for moving said pawl to inoperative position, and connections from said lever for operating said totalizer disengaging means, including a cam operating after said pawl has been moved to inoperative position.

11. In a machine of the class described, the combination with a totalizer, of differentially adjustable actuating racks therefor, a hand lever, independent devices actuated thereby for connecting the totalizer and racks and restoring the latter from their adjusted to their normal position thereby actuating said totalizer, and means for disabling the restoring device when the racks reach normal position to permit the continued movement of the hand lever whereby the totalizer and actuating racks are disconnected for the purpose described.

12. In a machine of the class described, the combination with clerks' and cashiers' detachable accumulating devices, each comprising adjustable slides, and each manually insertible into the machine, of two sets of elements in the machine constructed to be differentially positioned by the slides of said detachable devices respectively, as the same are inserted in the machine, a hand lever for restoring the cashiers' differential elements to normal position, a cashier's sub-totalizer actuated by said elements as the same are so restored, a main driving mechanism, connections therefrom for restoring the clerks' differential elements to normal position, a clerk's sub-totalizer actuated by the said clerks' elements as the same are so restored, and key controlled differential mechanism actuated by said main driving mechanism and constructed to actuate simultaneously and to equal extents both said clerk's and said cashier's sub-totalizer.

13. In a machine of the class described, the combination with a detachable accumulating device manually insertible into the machine, and comprising denominational elements, and means normally locking said elements, of rack segments differentially adjusted by the insertion of said accumulating device in the machine, a totalizer, a manually actuated arm, connections from said arm to restore said rack segments to normal positions, two cams actuated by said arm, connections from one of said arms to engage said rack segments and said totalizer, and connections from the other of said cams to release the locking means for the accumulating device denominational elements.

14. In a machine of the class described, the combination with a detachable accumulating device manually insertible in the machine, and comprising denominational elements, of a totalizer, key controlled differential mechanism having connections to actuate said totalizer, a hand lever, and devices, controlled by said hand lever, constructed to transfer at will the entire accumulation on said totalizer to the denominational elements of said accumulating device.

15. In a machine of the class described, the combination with a detachable accumulating device manually insertible in the machine and comprising: denominational elements, and means for positively locking said denominational elements; of a totalizer, key controlled differential mechanism having connections to actuate said totalizer, a hand lever, devices, controlled by said hand lever, constructed to transfer at will the entire accumulation on said totalizer to the denominational elements of said accumulating device, and connections from said lever controlling said denominational elements locking means.

16. In a machine of the class described, the combination with a detachable accumulator manually insertible in the machine and comprising denominational elements, of a totalizer also comprising denominational elements, key controlled differential mechanism having connections to actuate said totalizer, a manipulative device, constructed to transfer at will the entire accumulation on each denominational element of the totalizer to the corresponding denominational element of the accumulating device.

17. In a machine of the class described, the combination with a detachable accumulating device manually insertible in the machine, of a totalizer, key controlled differential mechanism for actuating said totalizer, a hand lever, and mechanism controlled by said hand lever, for resetting said totalizer to normal zero position and thereby transferring the entire accumulation on said totalizer to said accumulating device.

18. In a machine of the class described, the combination with a detachable accumulating device manually insertible in the machine, and comprising denominational elements, of a totalizer also comprising denominational elements, key controlled differential mechanism for actuating said totalizer, a hand lever, mechanism, controlled by said hand lever, for resetting said totalizer elements to normal zero positions, and connections for transferring the entire accumulation on each denominational element of the totalizer to the corresponding denominational element of the accumulating device by such resetting of the totalizer elements.

19. In a machine of the class described, the combination with a totalizer of a driving element therefor, a spring drawn rack carried by said driving element and positioned to engage said totalizer, a latching pawl carried by said driving element and normally preventing the spring drawn movement of said rack, transfer controlling devices actuated by said totalizer and constructed to displace said latching pawl, and means for reversely moving said rack and thereby permitting said latching pawl again to move to latching position.

20. In a machine of the class described, the combination with a totalizer and an accumulator, of an operating member, means actuated by said member under the control of the accumulator for transferring the amount on the latter to the totalizer, means for successively adding items to the transferred amount on the totalizer, and additional means actuated by the operating member for transferring at will the sum on the totalizer to the accumulator.

21. In a machine of the class described, the combination with an accumulator and a totalizer, of manipulative devices controlling the entering of amounts upon said totalizer, a reciprocatory operating member, and means controlled by the latter member when moving in one direction for transferring the amount upon the accumulator to the totalizer and when moving in the opposite direction for transferring to the accumulator the sum on the totalizer.

22. In a machine of the class described, the combination with an accumulator and a totalizer, of manipulative devices controlling the entering of amounts upon said totalizer actuating racks for the totalizer differentially adjusted by the accumulator, a reciprocatory operating member, means controlled by the latter member when moving in one direction for restoring the racks to normal position thereby transferring to the totalizer the amount on the accumulator, and additional means controlled by said member when moving in the opposite direction for transferring to the accumulator the sum on the totalizer.

23. In a machine of the class described, the combination with a totalizer, of two sets of actuators therefor, amount determining devices controlling the differential adjustment of one set of actuators and an accumulator controlling the differential adjustment of the other set of said actuators, and independent operating mechanism for the different sets of actuators for entering upon the totalizer the amount upon the accumulator and the amount represented by the operated amount determining devices.

24. In a machine of the class described, the combination with a totalizer, of a set of actuators therefor, an operating mechanism for said actuators, manipulative devices determining the extent of movement imparted to the actuators by the operating mechanism, a second set of actuators for said totalizer, a reciprocatory operating member for the latter set of actuators, an accumulator for determining the amount to be entered upon the totalizer by the second set of actuators, and means controlled by the reciprocatory member while moving in one direction for actuating the totalizer by the second set of actuators and while moving in the opposite direction for transferring to the accumulator the sum on the totalizer.

25. In a machine of the class described, the combination with a totalizer, of two sets of differentially movable actuators for operating the same, and independent operating means for each set of actuators.

26. In a machine of the class described, the combination with a totalizer, of two sets of actuators therefor, independent operating means for each set of actuators, an accumulator, and mechanism controlled by one of said operating means for transferring to the accumulator the sum on the totalizer.

27. In a machine of the class described, the combination with a plurality of totalizers, of a corresponding number of accumulators, independent operating devices and connections for transferring to the totalizers the amounts on the corresponding accumulators, and means controlled by one of said operating devices for actuating all of said totalizers independently of the above mentioned transferring operation and for then transferring back to one of the accumulators the sum on the corresponding totalizer.

28. In a machine of the class described, the combination with a plurality of totalizers, of a corresponding number of accumulators, independent operating devices and connections for transferring to the totalizers the amounts on the corresponding accumulators, means controlled by one of said operating devices for actuating all of said totalizers independently of the above mentioned transferring operation and for then transferring back to one of the accumulators the sum on the corresponding totalizer, and means controlled by another one of said operating devices for transferring at will the sum on one of the totalizers to its companion accumulator.

29. In a machine of the class described, the combination with a detachable accumulating device manually insertible into the machine and including an adjustable slide, of an element in the machine constructed to be differentially adjusted as said detachable device is inserted, a device having an invariable extent of movement at each operation of the machine, a member operated by said device an extent determined by the differential position of said adjusted member, and a type carrier set by said member.

30. In a machine of the class described, the combination of a detachable accumulating device manually insertible into the machine and including an adjustable slide, of an element in the machine constructed to be differentially adjusted as said device is inserted, means for locking said element in its adjusted position, a device having an invariable extent of movement at each operation of the machine, a member operated by said device an extent determined by the differential position of said adjusted member, and a type carrier set by said member while said member is in its locked position.

31. In a machine of the class described, the combination with a detachable accumulating device manually insertible into the machine and including an adjustable slide, of an element in the machine constructed to be differentially adjusted as said detachable device is inserted, a member constructed to be moved an extent determined by the adjusted position of said element the said element having a slot formed therein, and a device playing in said slot and having an invariable extent of movement at each operation of the machine for moving the member an extent determined by the differentially adjusted member.

32. In a machine of the class described, the combination with a totalizer, of an operating member therefor, actuating racks mounted on said member and capable of being given one unit of movement relative to the driving member, means normally preventing relative movement of said rack, connections from the totalizer for displacing said means, and means independent of the operating member for moving said rack reversely to render said preventing means effective.

33. In a machine of the class described, the combination with a totalizer, of a movable frame carrying the same, two sets of actuators for said totalizer, and independent means for rocking the totalizer into engagement with each set of actuators and for operating each set of actuators.

34. In a machine of the class described, the combination with a totalizer, of two sets of actuators therefor, an accumulator for differentially positioning one set of actuators, keys for controlling the extent of movement of the other set of actuators and independent operating means for each set of actuators.

35. In a machine of the class described, the combination with printing devices comprising type carriers and means for taking impressions therefrom, of a gripping device for a record material comprising two relatively movable parts, means for sliding said device after a printing impression, a spring actuated plate, link connections between said plate and said gripping parts, means normally preventing movement of said plate, and a device for rendering said preventing means ineffective to permit the plate to move so that the gripping parts are brought together and retained in such position during the sliding movement of the device.

36. In a machine of the class described, the combination with a plurality of totalizer elements, of independent actuators therefor on opposite sides thereof and normally out of engagement therewith, means for moving said elements into engagement with either of said actuators, and an alining device for said totalizer constructed to be withdrawn from said totalizer upon movement of said totalizer elements into engagement with either one of the actuators.

37. In a machine of the class described, the combination with a plurality of totalizer elements, of a carrying frame therefor, means for rocking said frame to either side of normal position, a fixed pin, and an alining pawl for said totalizer element having a slot receiving said pin said slot being so constructed that movement of said totalizer frame to either side of normal position withdraws said pawl from alining position.

38. In a machine of the class described, the combination with a plurality of totalizer elements, of a carrying frame therefor, means for moving said frame to either side of normal position, and an alining pawl for said elements, carried by said totalizer frame and adapted to be moved out of engagement with the totalizer elements upon movement of said frame to either side of normal position.

39. In a machine of the class described, the combination with a totalizer, of an actuator for operating said totalizer for addition or subtraction, an operating mechanism for said actuator, a second actuator for operating the said totalizer for addition, and an operating mechanism, independent of said first mentioned operating mechanism, for said second actuator.

40. In a machine of the class described, the combination with a totalizer, of a set of differentially movable actuators for adding or subtracting amounts on said totalizer, a second set of actuators for adding amounts on said totalizer, and independent operating means for each set of actuators.

In testimony whereof I affix my signature in the presence of two witnesses.

EDMUND S. CHURCH.

Witnesses:
 Roy C. Glass,
 Carl W. Beust.